(12) United States Patent
Yoshida

(10) Patent No.: US 10,102,177 B2
(45) Date of Patent: Oct. 16, 2018

(54) SERIAL COMMUNICATION SYSTEM, COMMUNICATION CONTROL UNIT, AND ELECTRONIC DEVICE FOR FINDING AND ASSIGNING UNUSED ADDRESSES

(71) Applicant: Renesas Electronics Corporation, Tokyo (JP)

(72) Inventor: Yoichi Yoshida, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 431 days.

(21) Appl. No.: 14/919,961

(22) Filed: Oct. 22, 2015

(65) Prior Publication Data

US 2016/0140077 A1 May 19, 2016

(30) Foreign Application Priority Data

Nov. 13, 2014 (JP) ................................. 2014-230697

(51) Int. Cl.
   *G06F 13/42* (2006.01)
   *G06F 13/40* (2006.01)
   *G06F 13/362* (2006.01)

(52) U.S. Cl.
   CPC ........ *G06F 13/4282* (2013.01); *G06F 13/362* (2013.01); *G06F 13/4068* (2013.01); *G06F 2213/0016* (2013.01)

(58) Field of Classification Search
   None
   See application file for complete search history.

(56) References Cited

U.S. PATENT DOCUMENTS

| | | | | |
|---|---|---|---|---|
| 6,363,437 B1 * | 3/2002 | Ptasinski | ............... | G06F 9/4411 710/10 |
| 7,013,355 B2 * | 3/2006 | Chambers | ........... | G06F 13/4291 710/110 |
| 7,149,838 B2 * | 12/2006 | Ervin | .................. | G06F 13/4045 710/306 |
| 7,284,079 B2 * | 10/2007 | Ervin | .................. | G06F 13/4045 710/110 |

(Continued)

FOREIGN PATENT DOCUMENTS

JP  2002-534734 A  10/2002

OTHER PUBLICATIONS

'I2C—bus specification and user manual—Rev. 6' by NXP, Apr. 4, 2014.*

(Continued)

*Primary Examiner* — Steven Snyder
(74) *Attorney, Agent, or Firm* — Mattingly & Malur, PC

(57) ABSTRACT

To provide a serial communication system that can flexibly or easily change a system configuration. For example, when coupled to first and second serial buses, a motor module transmits a first signal to the second serial bus. Subsequently, the motor module transmits a first command containing a candidate address to the first serial bus; meanwhile, the motor module searches for an address where an acknowledgement is not received in response to the first command. The motor module transmits the search result address to the second serial bus. A control unit at the reception of the first signal changes to a sleep state that stops communications with the first serial bus and receives an address as a search result from the second serial bus.

17 Claims, 19 Drawing Sheets

(56) References Cited

U.S. PATENT DOCUMENTS

| | | | | |
|---|---|---|---|---|
| 7,606,956 B2* | 10/2009 | Deshpande | ......... | G06F 13/4291 710/10 |
| 7,698,459 B2* | 4/2010 | Golding | ............. | G06F 13/4291 370/254 |
| 7,711,867 B2* | 5/2010 | Deshpande | ......... | G06F 13/4291 710/14 |
| 7,747,802 B2* | 6/2010 | Deshpande | ......... | G06F 13/4291 709/236 |
| 7,761,637 B2* | 7/2010 | Deshpande | ......... | G06F 13/4291 710/110 |
| 7,774,528 B2* | 8/2010 | Deshpande | ......... | G06F 13/4291 710/106 |
| 7,788,431 B2* | 8/2010 | Deshpande | ......... | G06F 13/4291 710/110 |
| 7,934,034 B2* | 4/2011 | Deshpande | ......... | G06F 13/4291 709/236 |
| 7,979,597 B2* | 7/2011 | Deshpande | ......... | G06F 13/4291 710/14 |
| 8,260,884 B2* | 9/2012 | Schmidt | ............. | G05B 19/0423 709/220 |
| 8,391,162 B2* | 3/2013 | Hsu | ................... | H04L 41/0213 370/241 |
| 8,489,786 B2* | 7/2013 | Radhakrishnan | ... | G06F 13/4291 710/10 |
| 9,753,886 B2* | 9/2017 | Tailliet | ................ | G06F 13/4291 |
| 2004/0225813 A1* | 11/2004 | Ervin | ................... | G06F 13/4045 710/305 |
| 2004/0225814 A1* | 11/2004 | Ervin | ................... | G06F 13/4045 710/305 |
| 2005/0165989 A1* | 7/2005 | Kim | ........................ | G06F 13/24 710/260 |
| 2005/0246475 A1* | 11/2005 | Ervin | ................... | G06F 13/4045 710/306 |
| 2007/0220167 A1* | 9/2007 | Golding | ............. | G06F 13/4291 709/238 |
| 2008/0147941 A1* | 6/2008 | Deshpande | ......... | G06F 13/4068 710/110 |
| 2008/0189458 A1* | 8/2008 | Deshpande | ......... | G06F 13/4291 710/110 |
| 2008/0195764 A1* | 8/2008 | Deshpande | ......... | G06F 13/4291 710/8 |
| 2008/0201511 A1* | 8/2008 | Deshpande | ......... | G06F 13/4291 710/110 |
| 2008/0215779 A1* | 9/2008 | Deshpande | ......... | G06F 13/4291 710/110 |
| 2008/0215780 A1* | 9/2008 | Deshpande | ......... | G06F 13/4291 710/110 |
| 2008/0288662 A1* | 11/2008 | Doorenbos | ......... | G06F 13/4291 710/4 |
| 2008/0307134 A1* | 12/2008 | Geissler | ............. | G06F 13/4291 710/110 |
| 2010/0217903 A1* | 8/2010 | Deshpande | ......... | G06F 13/4291 710/110 |
| 2011/0113171 A1* | 5/2011 | Radhakrishnan | ... | G06F 13/4291 710/110 |
| 2016/0267029 A1* | 9/2016 | Nagase | ................... | G06F 13/24 |
| 2016/0371210 A1* | 12/2016 | Van Der Zande | | G06F 13/4291 |
| 2018/0143935 A1* | 5/2018 | Cox | ....................... | G06F 13/362 |
| 2018/0150425 A1* | 5/2018 | Takahashi | ............. | G06F 13/364 |

OTHER PUBLICATIONS

IBM Technical Disclosure "Hot-Insertion of I2C Devices," Jun. 21, 2003.*

IBM Technical Disclosure "I2C Automatically Connection Solution Between BMC and Add-In Cards," Dec. 16, 2013.*

* cited by examiner

SERIAL COMMUNICATION SYSTEM, COMMUNICATION CONTROL UNIT, AND ELECTRONIC DEVICE FOR FINDING AND ASSIGNING UNUSED ADDRESSES

CROSS-REFERENCE TO RELATED APPLICATIONS

The disclosure of Japanese Patent Application No. 2014-230697 filed on Nov. 13, 2014 including the specification, drawings and abstract is incorporated herein by reference in its entirety.

BACKGROUND

The present invention relates to a serial communication system, a communication control unit, and an electronic device, and concerns, for example, a plug-and-play system in a serial bus.

Japanese Translation of PCT International Application Publication No. JP-T-2002-534734 describes a system for dynamically determining which one of removable slave units is coupled to a I2C (Inter-Integrated Circuit) bus. Specifically, a micro controller unit stores beforehand a table indicating the relationship between the models and addresses of the slave units. The micro controller unit sequentially transmits commands containing the addresses to the I2C bus based on the table and identifies the presence or absence of the slave units depending on the presence or absence of response from the slave units.

SUMMARY

For example, a typical control system for controlling robots or the like includes multiple controlled modules of various types (electronic devices) such as a motor module and a sensor module. In a specific configuration, for example, a control unit such as a microcomputer and controlled modules of various types are coupled via a serial bus, allowing the control unit to control the controlled modules of various types through the serial bus. The serial bus may be, for example, a widely used I2C bus.

In such a control system, a system configuration can be desirably changed in a flexible manner. For example, the combination of controlled modules to be coupled to a serial bus is changed in a development stage or a new controlled module to be coupled to the serial bus is added to expand capability after development. Additionally, the system configuration can be desirably changed with ease. For example, in a system that requires a user to perform a complicated setting operation every time the controlled module is coupled to the serial bus, the system configuration is difficult to change with ease.

A plug-and-play function is advantageously used to easily change the system configuration. In the case where the plug-and-play function is obtained with a I2C bus, for example, the system of Japanese Translation of PCT International Application Publication No. JP-T-2002-534734 may be used. In the system of Japanese Translation of PCT International Application Publication No. JP-T-2002-534734, however, the models and addresses of the controlled modules to be coupled are stored beforehand in the table, and the controlled modules are removable in a set range of the table. Thus, a restriction on the detachable controlled modules may result in an insufficient plug-and-play function. This may reduce flexibility when the system configuration is changed.

The number of controlled modules that can be coupled to the I2C bus is determined according to an address space (e.g., 7 bits). However, the controlled modules actually need to be controlled within a predetermined control period, leading to a restriction on the number of controlled modules that can be coupled to the I2C bus. Hence, even a restriction on the number of actually controlled modules may result in lower flexibility when the system configuration is changed.

The following embodiments are made in view of these circumstances. Other problems and new features will become apparent from the description and accompanying drawings of the specification.

A serial communication system according an embodiment includes: first and second serial buses, a control unit, and a plurality of electronic devices. The control unit is connected to the first and second serial buses and transmits a first command containing an address to the first serial bus. The electronic devices are each detachable from the first and second serial buses. If the electronic device coupled to the first and second serial buses receives the first command containing the address of the electronic device from the first serial bus, the electronic device transmits an acknowledgement to the first serial bus. In this case, each of the electronic devices performs first to third processing. When the electronic devices are coupled to the first and second serial buses in the first processing, a first signal is transmitted to the second serial bus. In the second processing, the electronic device transmits the first signal and then transmits the first command containing a candidate address to the first serial bus; meanwhile, the electronic device searches for an address where an acknowledgement is not received in response to the first command. In the third processing, the electronic device transmits the search result address of the second processing to the second serial bus. The control unit at the reception of the first signal changes to a sleep state that stops communications with the first serial bus and then receives the search result address from the second serial bus.

The embodiment can flexibly or easily change the system configuration of the serial communication system.

DETAILED DESCRIPTION

Figure 1:
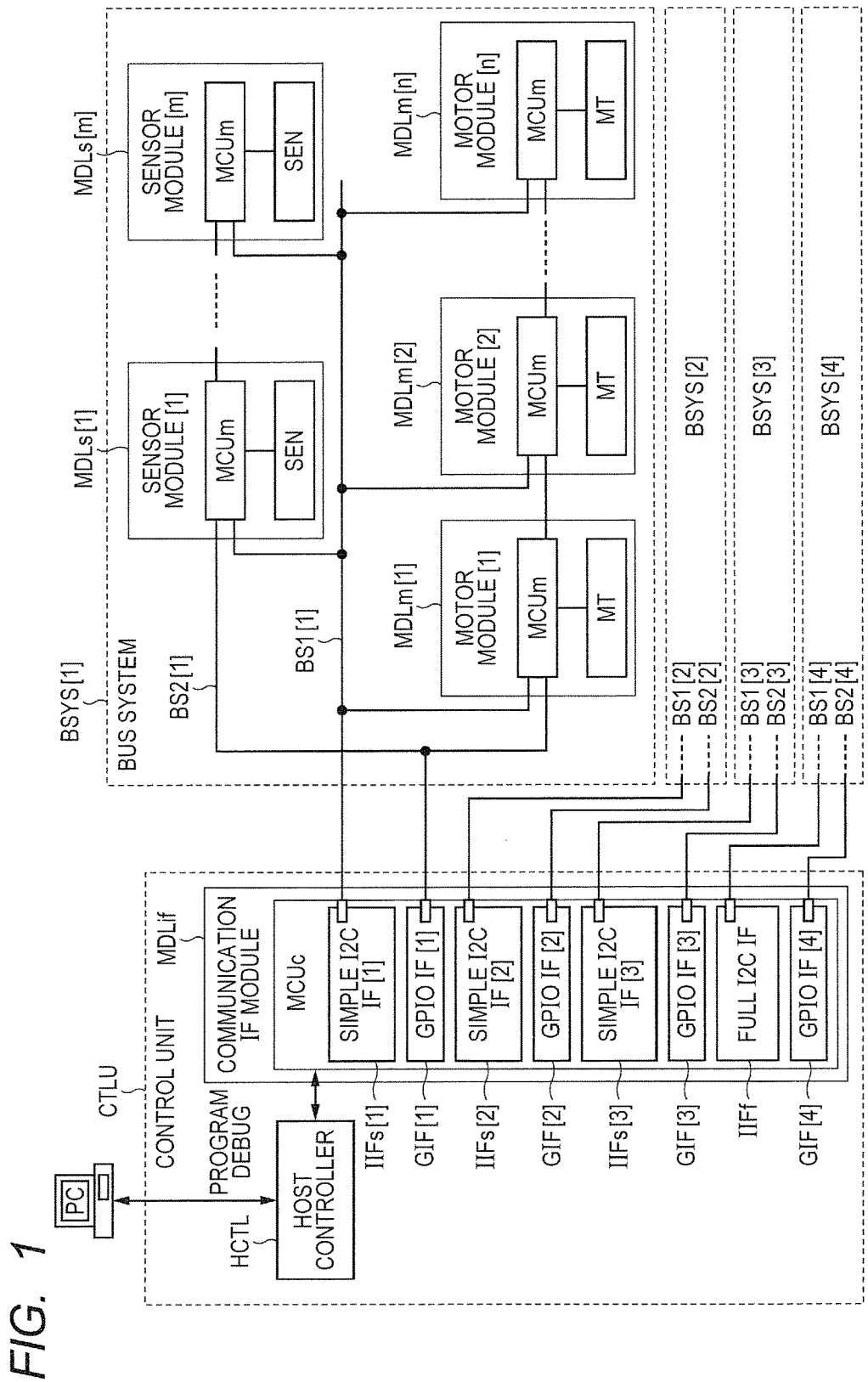
FIG. 1 is a circuit block diagram schematically showing a configuration example of a serial communication system according to a first embodiment of the present invention.

In the following embodiments, a plurality of sections or embodiments will be separately described for convenience as necessary but are not irrelevant to one another unless otherwise specified. One of the sections or embodiments is a modification, a detailed description, a supplementary explanation, and so on of at least apart of other sections or embodiments. In the following embodiments, the number of elements (e.g., the number of elements, a numeric value, an amount, and a range) is not limited to a specific number unless otherwise specified or theoretically and clearly limited to a specific number. Thus, the number of elements may be equal to or smaller or larger than the specific number.

Moreover, in the following embodiments, it is needless to say that constituent elements (including element steps) are not always necessary unless otherwise specified or theoretically and clearly required. Similarly, in the following embodiments, the shapes and positional relationship of the constituent elements may include shapes substantially close or similar to the shapes of the constituent elements unless otherwise specified or theoretically and clearly close or similar to the shapes of the constituent elements. The numeric value and range may include numeric values and ranges close or similar to those of the constituent elements.

Furthermore, a circuit element including each functional block of the embodiments is not particularly limited and is formed on a semiconductor substrate composed of, for example, single crystal silicon according to integrated circuit technology using a known CMOS (complementary MOS transistor).

The embodiments of the present invention will be specifically described below with reference to the accompanying drawings. In all the drawings illustrating the embodiments, the same members are fundamentally indicated by the same reference numerals and the repeated explanation thereof is omitted.

First Embodiment

<<The Configuration of a Serial Communication System>>

FIG. 1 is a circuit block diagram showing a schematic configuration example of a serial communication system according to a first embodiment of the present invention. The serial communication system in FIG. 1 includes a control unit CTLU and a plurality of (four in FIG. 1) bus systems BSYS [1] to BSYS [4]. The bus system. BSYS [1] includes an I2C bus (first serial bus) BS1[1], a GPIO (General Purpose Input/Output) bus (second serial bus) BS2[1], and a plurality of controlled modules (electronic devices).

Similarly, the bus systems BSYS[2] to BSYS [4] include I2C buses BS1[2] to BS1[4], GPIO buses BS2[2] to BS2[4], and a plurality of controlled modules.

In the specification, the I2C buses BS1[1] to BS1[4] are represented as a I2C bus (first serial bus) BS1 and the GPIO buses BS2[1] to BS2[4] are represented as a GPIO bus (second serial bus) BS2. Moreover, the bus systems BSYS [1] to BSYS [4] are represented as a bus system BSYS. The controlled modules (electronic devices) are detachable from the corresponding I2C bus BS1 and GPIO bus BS2 via connectors and so on.

In the example of FIG. 1, the I2C bus BS1[1] and the GPIO bus BS2[1] are coupled to a plurality of (m) sensor modules MDLs[1] to MDLs[m] and a plurality of (n) motor modules MDLm [1] to MDLm [n]. The bus systems BSYS [2] to BSYS [4] are also optionally coupled to the controlled modules (electronic devices), which are not shown.

The control unit CTLU includes a host controller (host control unit) HCTL and a communication IF module (communication control unit) MDLif. The communication IF module MDLif includes a control device MCUc represented as, for example, a microcontroller. The control device MCUc includes a plurality of I2C interfaces (first serial interfaces) connected to the I2C bus BS1[1] to BS1[4], respectively, and a plurality of GPIO interfaces (second serial interfaces) GIF[1] to GIF [4] connected to the GPIO buses BS2 [1] to BS2 [4], respectively.

In the example of FIG. 1, the I2C interfaces include three simple I2C interfaces IIFs [1] to IIFs [3] connected to the three I2C buses BS1 [1] to BS1 [3], respectively, and a full I2C interface IIFf connected to the I2C bus BS1 [4]. In the specification, the simple I2C interfaces IIFs [1] to IIFs [3] are represented as a simple I2C interface IIFs, and the simple I2C interface IIFs and the full I2C interface IIFf are represented as a I2C interface IIF. The GPIO interfaces GIF [1] to GIF [4] are represented as a GPIO interface GIF.

Figure 2:
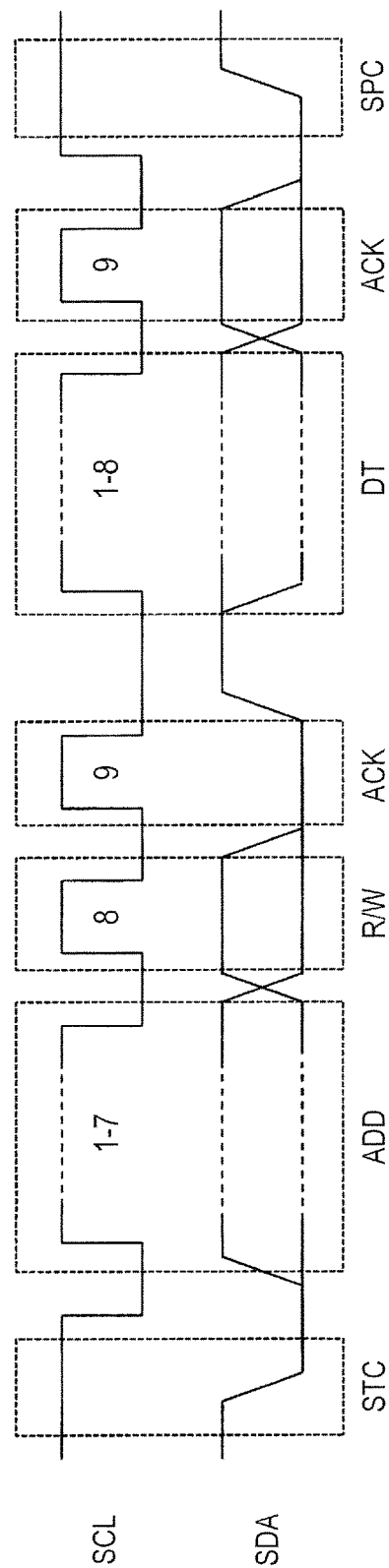
FIG. 2 is a schematic diagram showing an example of the data format of an I2C bus.

In this configuration, the full I2C interface indicates an interface operable in a master state and a slave state based on the 12C standard, whereas the simple I2C interface indicates an interface that is operable only in a master state but is inoperable in a slave state. FIG. 2 is a schematic diagram showing an example of the data format of the I2C bus. The I2C bus BS1 includes a clock wire that transmits a clock signal SCL and a data wire that transmits a data signal SDA.

Based on the I2C standard, as shown in FIG. 2, the I2C interface IIF to transmit a command changes the data signal SDA from 'H' level to 'L' level in an 'H' level period of the clock signal SCL, transmitting a start condition STC to the I2C bus BS1. The I2C interface IIF operates in a master state if the start condition STC transmitted by the I2C interface IIF is confirmed to be effective through an arbitration function of the I2C standard. The I2C interface IIF operates in a slave state when receiving the start condition STC from the I2C bus BS1.

The I2C interface IIF in a master state can transmit a command (first command) containing a slave address ADD to the I2C interface IIF in a slave state. Specifically, as shown in FIG. 2, the command (first command) contains the slave address ADD of, for example, 7 bits, a 1-bit read/write selection signal (R/W) following the slave address ADD, and data DT if a writing command is selected by the selection signal.

The I2C interface IIF in a slave state transmits an acknowledgment ACK to the I2C bus BS1 if the I2C interface IIF receives the command (first command) containing the slave address ADD of the I2C interface IIF. Specifically, as shown in FIG. 2, the I2C interface IIF in a slave state receives the read/write selection signal (R/W) and transmits the acknowledgment ACK. The I2C interface IIF in a master state receives the acknowledgment ACK. The data wires of the data signal SDA have a wired AND coupling. The I2C interface IIF in a master state receives a negative acknowledgment NAK ('H' level) if the acknowledgment ACK ('L' level) cannot be received.

The I2C interface IIF in a master state transmits the data DT of, for example, 8 bits if the acknowledgment ACK ('L' level) is received from the I2C interface IIF in a slave state in the selection of the writing command. The I2C interface IIF in a slave state transmits the acknowledgment ACK if the data DT is received. If the I2C interface IIF in a master state selects a reading command, the I2C interface IIF in a slave state transmits the data DT of, for example, 8 bits subsequent to the acknowledgment ACK ('L' level). The I2C interface IIF in a master state transmits the acknowledgment ACK if the data DT is received.

Subsequently, the I2C interface IIF in a master state changes the data signal SDA from 'L' level to 'H' level at the end of the master state in an 'H' level period of the clock signal SCL, transmitting a stop condition SPC to the I2C bus BS1. This opens the I2C bus BS1.

In this way, according to the I2C standard, only the I2C interface IIF in a master state transmits the command (first command) to the I2C bus BS1 and then the I2C interface IIF in a slave state receives the command from the I2C bus BS1. Thus, the full I2C interface IIFf includes a command transmitting unit for transmitting the command (first command) and a command receiving unit for receiving the command (first command), whereas the simple I2C interface IIFs only includes a command transmitting unit.

The sensor modules MDLs [1] to MDLs [m] each include a control device MCUm typified by a microcontroller or the like and a sensor SEN. Similarly, the motor modules MDLm [1] to MDLm [n] each include the control device MCUm and a motor MT. The control device MCUm includes a full I2C interface (first serial interface) and a GPIO interface (second serial interface), which are not shown. If the controlled modules are coupled to the I2C bus BS1[1] and the GPIO bus BS2[1], the full I2C interface and the GPIO interface are connected to the I2C bus BS1[1] and the GPIO bus BS2[1], respectively.

The host controller (host control unit) HCTL includes a control device (not shown) typified by a microcontroller or the like. The host controller HCTL issues a control command (second command) for controlling the controlled modules based on a predetermined control program and so on. The control command (second command) contains, for example, device identifiers for identifying the controlled modules and types of data writing and reading. The host controller (host control unit) HCTL is connected to the communication IF module MDLif via an SPI (Serial Peripheral Interface) bus or the like, which is not particularly limited.

The communication IF module MDLif mediates communications between the host controller HCTL and the bus system BSYS (that is, the controlled modules) while converting the control command (second command) from the host controller HCTL into the command (first command) to the I2C bus BS1. At this point, the I2C interfaces IIF in the control device MCUc of the communication IF module MDLif operate in a master state while the I2C interfaces in the control devices MCUm of the controlled modules operate in a slave state.

Subsequently, the communication IF module MDLif distributes the control command (second command), which is received from the host controller HCTL via the SPI bus or the like, to the I2C bus BS1 at a lower speed than the SPI bus depending on the device identifier, and then the communication IF module MDLif transmits the command (first command) to the I2C bus BS1. When the reading command is transmitted to the I2C bus BS1, the communication IF module MDLif receives the data DT that is transmitted from the controlled modules in response to the transmission, and then the communication IF module MDLif transmits the data DT to the host controller HCTL through the SPI bus or the like.

If general-purpose microcontrollers includes the control devices MCUc and MCUm in the serial communication system, typically, only one or two full I2C interfaces IIFf are mounted. This is because the I2C bus is conceptually connected to all the controlled modules to be controlled, and multiple full I2C interfaces IIFf mounted in microcomputers or the like may lead to a considerable increase in circuit size and cost.

In the case of a small number of full I2C interfaces IIFf, the full I2C interfaces IIFf may not sufficiently support the system for controlling the multiple controlled modules (including motors/sensor modules), typified by a robot or the like. For example, in the case of an articulated manipulator, the control unit CTLU needs to control the controlled modules with a control period of 10 ms or less in order to obtain a sufficiently smooth movement. If the control period is obtained with the I2C bus at a communication speed of 100 kbps, the number of controlled modules connectable to the single I2C bus is about ten. In the case of an articulated manipulator, more than several tens controlled modules may be necessary.

The multiple controlled modules may be placed under the parallel control of the control devices, each including, for example, one or two full I2C interfaces IIFf. In this case, however, the provision of the control devices may increase the cost and lead to complicated control associated with synchronous control among the control devices.

Thus, the simple I2C interface IIFs mounted as shown in FIG. 1 is advantageously used. For example, the circuit size of the simple I2C interface IIFs is one half or smaller than that of the full I2C interface IIFf. Moreover, the microcontroller is essentially placed on a controlling side (master side) instead of a controlled side (slave side). Thus, in view of practical use, the simple I2C interface IIF is advantageously operated only in a master state.

In the serial communication system of FIG. 1, the system configuration may need to be changed with flexibility or ease. For example, a control system for a robot is developed. In this case, as shown in FIG. 1, a developer continues system development while optionally changing a control program stored in the host controller HCTL with a development terminal PC. In this process, the controlled modules may be frequently attached or detached in the bus system BSYS.

In this configuration, the coupling of the controlled module to the bus system BSYS typically requires a setting for placing the controlled module into a controllable state, for example, address assignment and an initial parameter setting for the controlled module. Such a complicated setting is made every time the controlled module is coupled to the bus system BSYS, leading to difficulty in obtaining convenience for a developer. Furthermore, another controlled module may be added to the bus system BSYS to expand functionality not only in the process of development but also after the completion of the system. Also in this case, a complicated user setting is desirably unrequested. Thus, the I2C bus BS1 advantageously has a plug-and-play function.

<<A Plug-and-Play Operation [1] of the Serial Communication System>>

Figure 3:
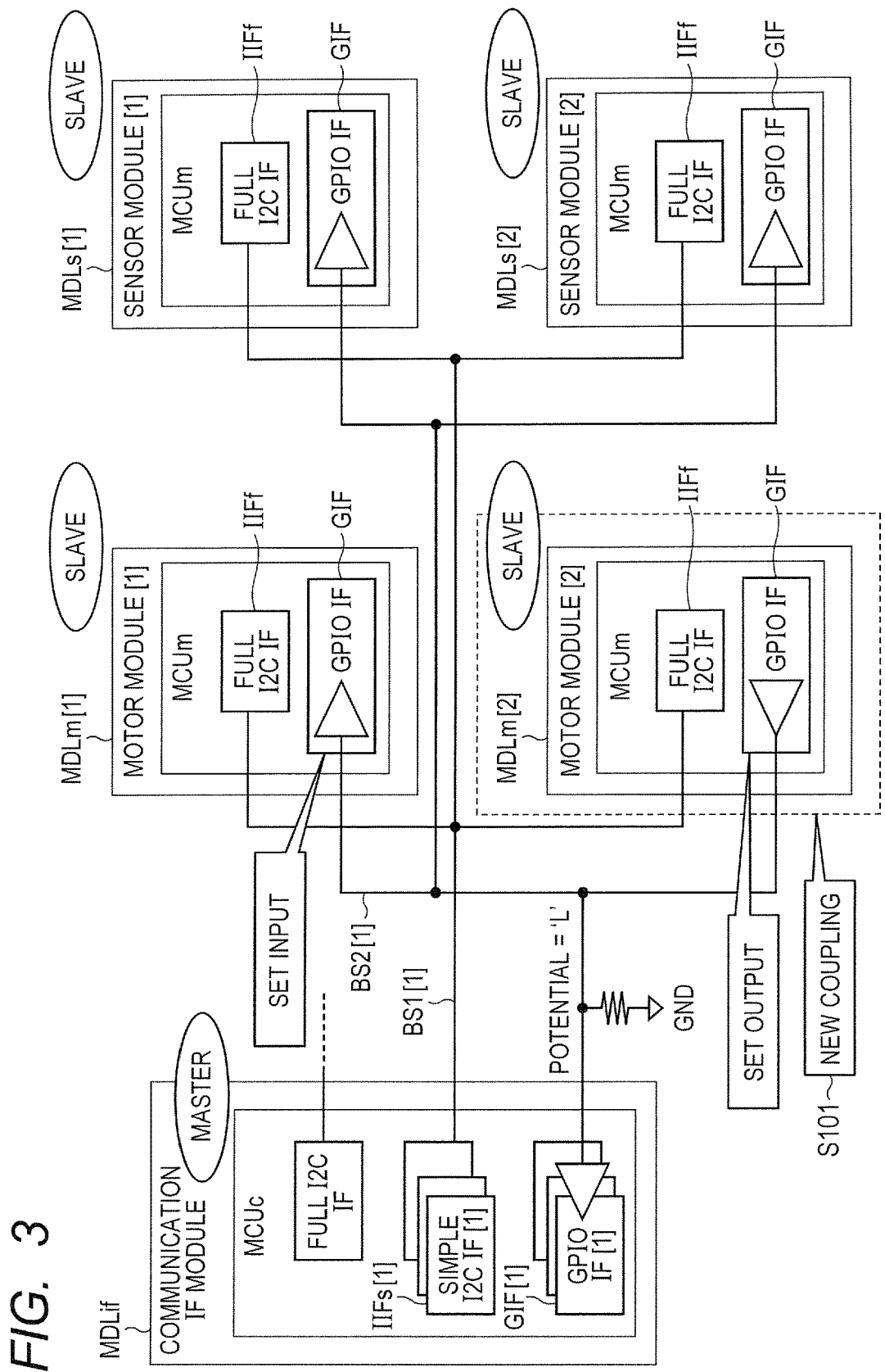
FIG. 3 is an explanatory drawing showing an example of a plug-and-play operating method in the serial communication system of FIG. 1.
Figure 4:
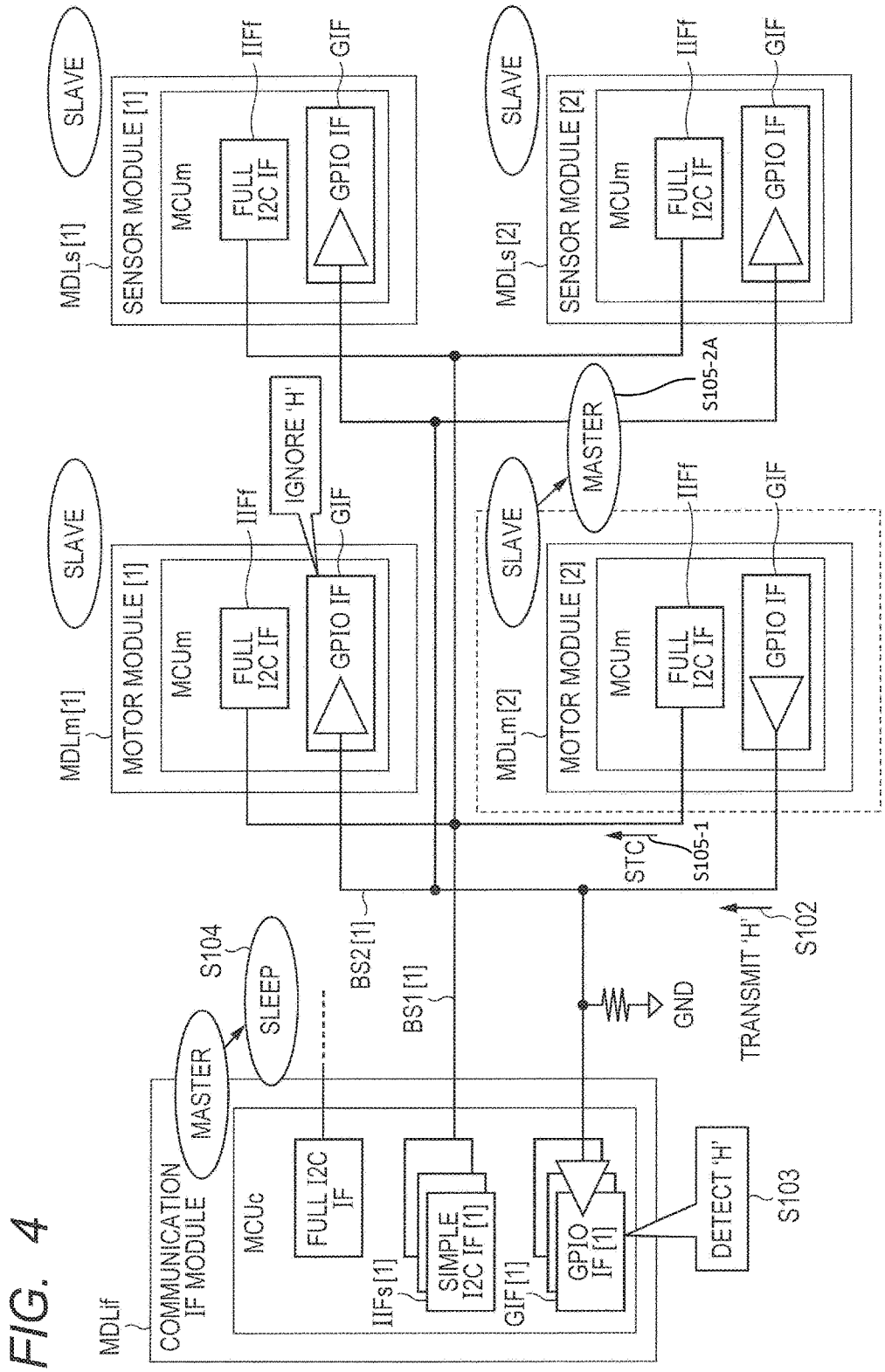
FIG. 4 is an explanatory drawing showing the example of the operating method subsequent to FIG. 3.
Figure 5:
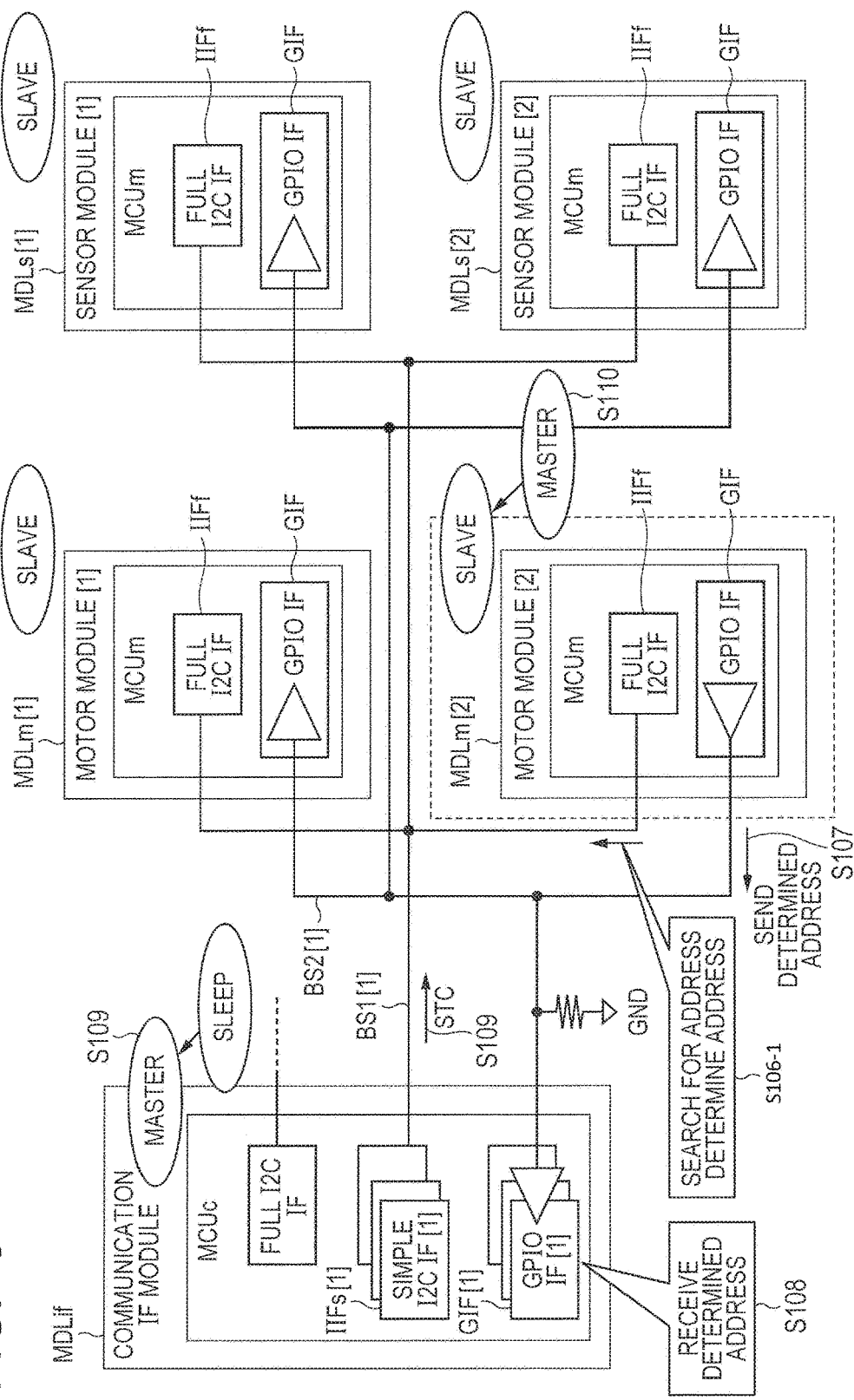
FIG. 5 is an explanatory drawing showing the example of the operating method subsequent to FIG. 4.

FIGS. 3, 4, and 5 are explanatory drawings showing an example of a plug-and-play operating method in the serial communication system of FIG. 1. In the example of FIG. 3, first, the motor module MDLm [2] is newly coupled to the I2C bus BS1[1] and the GPIO bus BS2[1] (Step S101). A power supply voltage is supplied to the newly coupled motor module MDLm [2] from a separately provided power line and so on.

In response to the supply of the power supply voltage, the control device MCUm of the motor module (electronic device) MDLm [2] performs an initialization sequence. In the initialization sequence, the control device MCUm controls the full I2C interface IIFf in a slave state and the GPIO interface GIF in an output state. At this point, the controlled module (e.g., the motor module MDLm [1]) and the communication IF module (communication control unit) MDLif, which have been coupled to the bus, set the GPIO interfaces GIF and GIF [1] into an input state.

The potential of the GPIO bus BS2 [1] is set at a ground potential GNS ('L' level) by a pull-down resistor. The potential of the GPIO bus BS2 [1] may be set at a power supply potential ('H' level) by a pull-up resistor. The GPIO interface typically has the function of presetting the pull-down resistor/pull-down resistor. Thus, a wired logic (a wired OR in the example of FIG. 3) is constructed in the GPIO bus BS2 [1].

Subsequently, as shown in FIG. 4, the newly coupled motor module MDLm [2] first transmits 'H' level to the GPIO bus BS2[1] through the GPIO interface GIF (Step S102). The communication IF module MDLif monitors a potential of the GPIO bus BS2[1] through the GPIO interface GIF [1] and recognizes the new coupling of the controlled module when detecting the 'H' level (Step S103).

When detecting a change of the potential of the GPIO bus BS2[1] to 'H' level, the communication IF module MDLif changes the simple I2C interface IIFs [1] of the I2C bus BS1[1] for the GPIO bus into a sleep state (Step S104). The simple I2C interface IIFs [1] in a sleep state stops communications with the I2C bus BS1[1]. The control device MCUc sets a flag in a register that controls valid/invalid of a sleep state, which is not particularly limited. The simple I2C interface IIFs [1] invalidates the operation of the simple I2C interface IIFs [1] in response to the flag.

Subsequently, the motor module MDLm [2] transmits a master declaration signal (that is, the start condition STC in FIG. 2) for an operation of the motor module MDLm [2] in a master state, to the coupled I2C bus BS1[1] through the full I2C interface IIFf (Step S105-1). At this point, the simple I2C interface IIFs [1] of the communication IF module MDLif is placed in a sleep state and thus the master declaration signal is negligible. The full I2C interfaces IIFf of other controlled modules (motor modules MDLm [1]) receive the master declaration signal and recognize the newly set I2C interface in a master state.

After that, as shown in FIG. 5, the motor module MDLm [2] transmits the command (first command) containing a candidate address to the I2C bus BS1[1] through the full I2C interface IIFf; meanwhile, the motor module MDLm [2] searches for an address where the acknowledgment ACK corresponding to the command is not received (Step S106-1). Specifically, the motor module MDLm [2] transmits a command containing the address of a predetermined initial value, to the I2C bus BS1[1]. If the acknowledgment ACK is received, the address is changed (e.g., an increment) and then the command containing the address is transmitted again. As a result of the search, the motor module MDLm [2] can determine a unique address for the I2C bus BS1[1].

Subsequently, the motor module MDLm [2] transmits the determined address to the GPIO bus BS2[1] through the GPIO interface GIF (Step S107). The GPIO interface GIF [1] of the communication IF module MDLif receives the determined address (Step S108). Specifically, for example, GPIO interface communication protocols such as a communication speed and a preamble are determined beforehand by programs and so on between the communication IF module MDLif and the controlled modules, allowing a notification of the address based on the communication protocols.

The other controlled modules (including the motor module MDLm [1]) are configured to ignore the address obtained by the notification. However, if it is necessary to identify the address of the controlled module newly coupled to the other controlled modules, the address obtained by the notification can be received as in the case of the communication IF module MDLif.

At the completion of the reception of the address from the motor module MDLm [2], the communication IF module MDLif recovers from a sleep state and transmits the master declaration signal to the I2C bus BS1[1] (Step S109). The motor module MDLm [2] receives the master declaration signal and changes to a slave state (Step S110). Thus, the control unit CTLU can communicate with all the controlled modules including the newly coupled motor module MDLm [2].

The communications allow the control unit CTLU to obtain various kinds of information stored beforehand in the motor module MDLm [2], through the I2C bus BS1[1]. The information includes, for example, module-type information on the motor module and the sensor module and command information on functions and variables that are used by the control program of the host controller HCTL to provide the control command (second command). The command information for the motor module includes a function for rotating a motor, the value of a fixed parameter used for the function, and the settable range of a variable parameter (e.g., a rotation speed) used for the function.

For example, in the process of system development in FIG. 1, the control unit CTLU reflects, in the development terminal PC, the information obtained from the newly coupled controlled module. Specifically, the control unit CTLU displays the obtained information on the screen of the development terminal PC, the information being associated with, for example, the device identifier of the controlled module. This can construct a highly convenient development environment for a developer.

<<The Main Effect of the Serial Communication System>>

The serial communication system in FIG. 1 performs the plug-and-play operation as shown in FIGS. 3 to 5, typically enabling a change of the system configuration with flexibility or ease. For example, when the controlled module (electronic device) is coupled to the I2C bus BS1 and the GPIO bus BS2, a user does not need to perform a setting operation typified by address assignment. This can easily change the system configuration. Moreover, the types and number of controlled modules that can be coupled to the I2C bus BS1 and the GPIO bus BS2 are not particularly limited. This can flexibly change the system configuration.

For example, the system of Japanese Translation of PCT International Application Publication No. JP-T-2002-534734 is usable as a comparative example. In this system, the control unit first recognizes a new coupling of the controlled module in some way. Subsequently, the control unit identifies the presence or absence of the controlled modules while sequentially transmitting, to the bus system BSYS, all the addresses (the slave address ADD in FIG. 2) stored in a predetermined table.

It is however assumed that the single I2C bus is basically used in this system. Moreover, the controlled module that can be newly coupled is limited by the table. This may reduce flexibility when the system configuration is changed. Moreover, it is necessary to devise how to recognize new coupling of the controlled module by means of the control unit. Furthermore, the control unit needs to transmit all the addresses in the table to the bus system BSYS when recognizing the address of the newly coupled controlled module. In this case, a required time period needs to increase with, in particular, the number of controlled modules. This may reduce user convenience and ease in changing the system configuration.

In the system of the first embodiment, the controlled module notifies the control unit (control device MCUc) of the address of the controlled module in addition to the new coupling of the controlled module through the GPIO bus BS2. Specifically, instead of the control unit, the controlled module searches for a usable address through the I2C bus BS1 and then the control unit is notified of the search result. This eliminates the need for searching all the addresses unlike in Japanese Translation of PCT International Application Publication No. JP-T-2002-534734, thereby shortening an address search time.

At this point, however, the simple I2C interface IIFs particularly in the control unit provided for the multiple controlled modules cannot operated in a slave state. Thus, the simple I2C interface IIFs changes to a sleep state to stop communications with the I2C bus BS1, and then the simple I2C interface IIFs in this state receives an address as a search result through the GPIO bus BS2. This system can resolve the problem of Japanese Translation of PCT International Application Publication No. JP-T-2002-534734 so as to flexibly or easily change the system configuration.

In the example of FIG. 1, the host controller (host control unit) HCTL and the communication IF module (communication control unit) MDLif include the different control devices (semiconductor chips, e.g., two microcontrollers) but may include common control devices. However, the configuration of the different control devices may further increase user convenience. Specifically, the host controller HCTL may include widely used devices typified by, for example, an Arduino (registered trademark) substrate and a Raspberry Pi (registered trademark) substrate. In this case, a user can develop a desired control system using a familiar development environment.

The second serial bus is not limited to the GPIO bus BS2 as long as the second serial bus eliminates the need for specifying an address and so on during communications. However, the GPIO bus BS2 only requires a single wire and allows the use of a wired logic, which is particularly advantageous to the second serial bus. The GPIO bus BS2 used with the plug-and-play function may be used when the controlled module transmits an interrupt signal, for example, during a normal operation after the completion of coupling.

In this operation example, the plug-and-play function is achieved by the simple I2C interface IIFs. The same system also allows the full I2C interface IIFf to achieve the plug-and-play function. At this point, the full I2C interface IIFf is operable in a slave state and thus can transmit an address through the I2C bus BS1[1] in step S107. However, the processing in FIGS. 3 to 5 is more desirable in view of uniformed processing between the full I2C interface IIFf and the simple I2C interface IIFs.

<<A Plug-and-Play Operation [2] of the Serial Communication System>>

Figure 6:
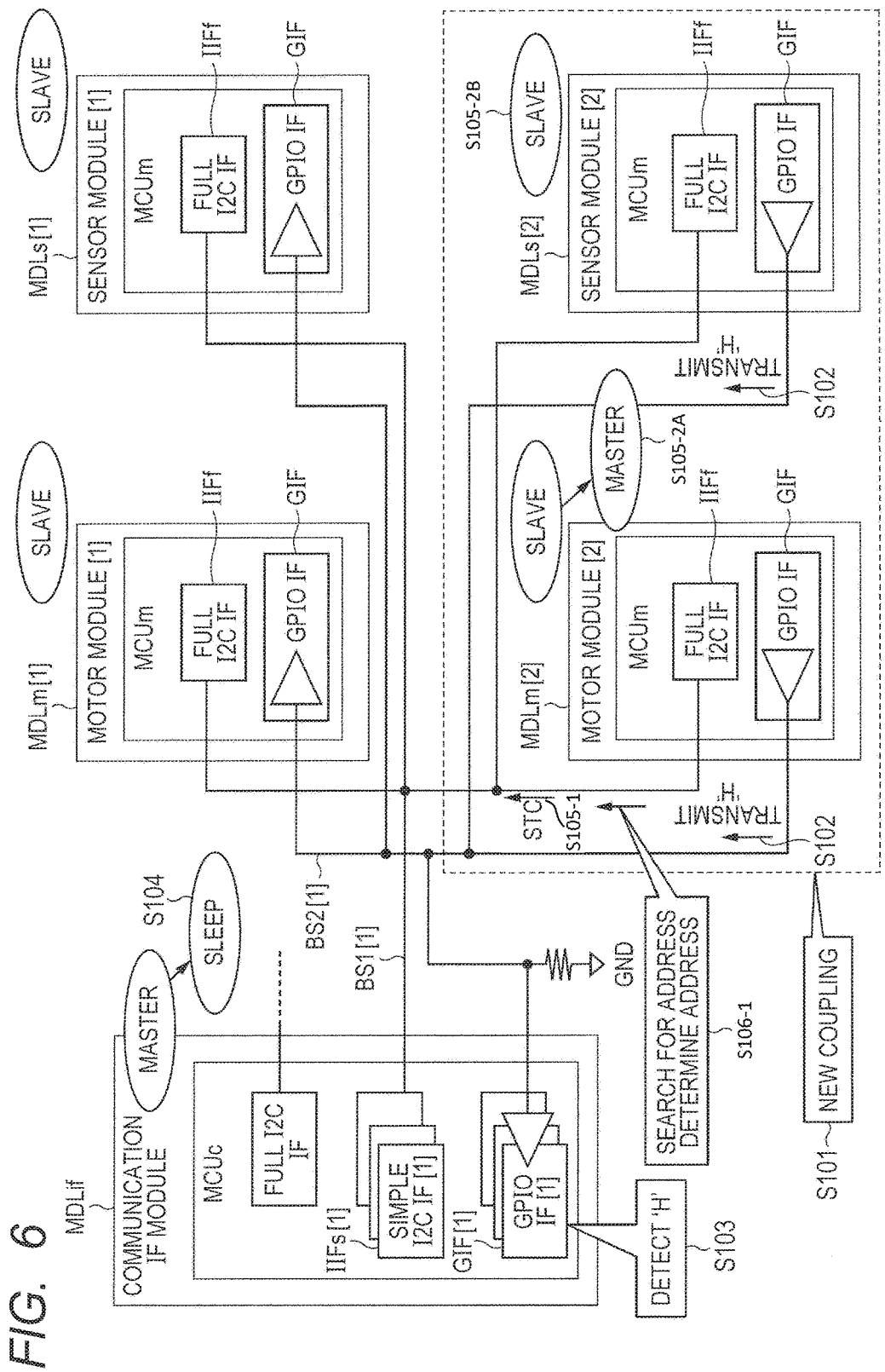
FIG. 6 is an explanatory drawing showing another example of the plug-and-play operating method in the serial communication system of FIG. 1.
Figure 7:
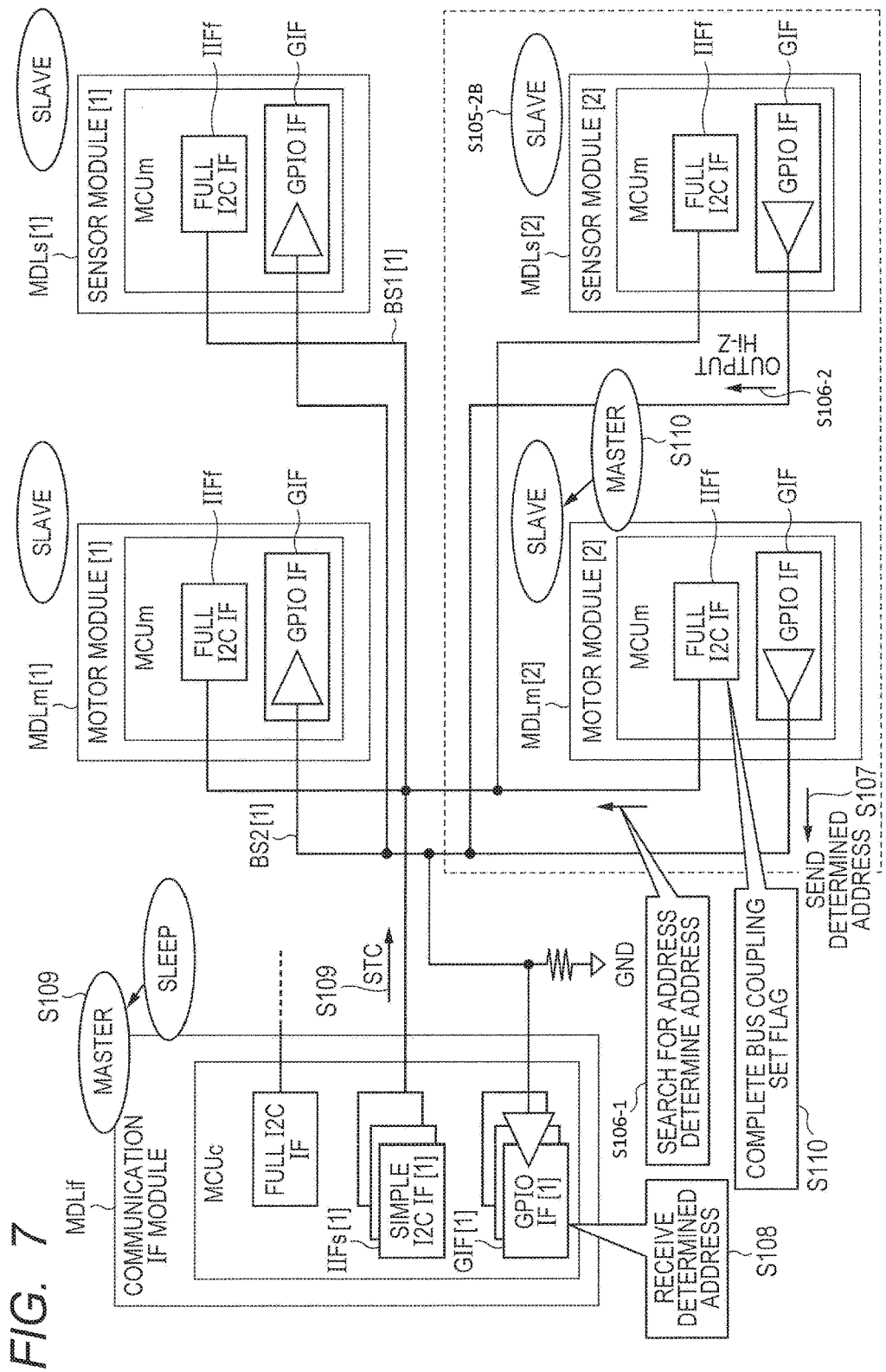
FIG. 7 is an explanatory drawing showing the example of the operating method subsequent to FIG. 6.
Figure 8:
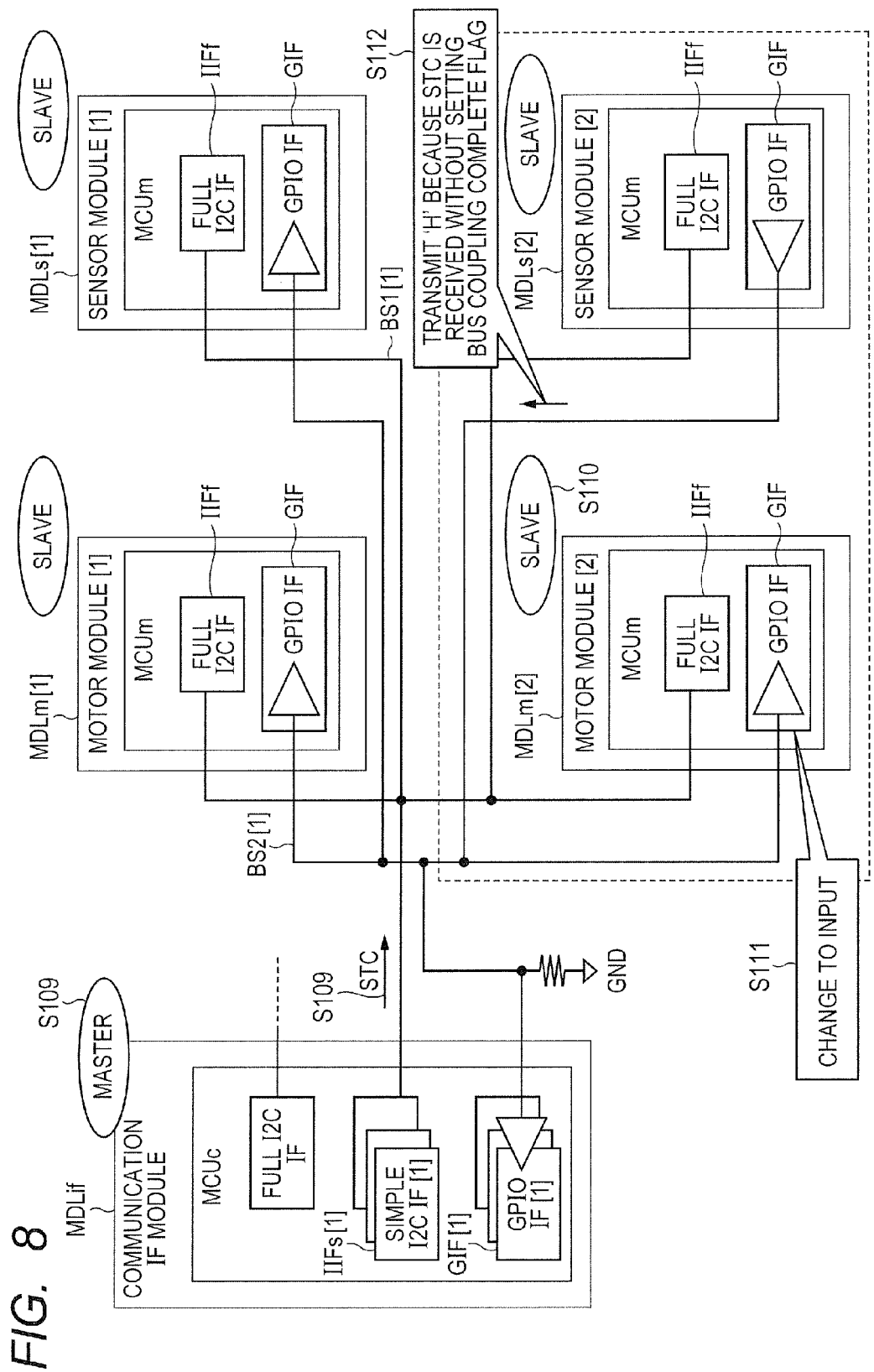
FIG. 8 is an explanatory drawing showing the example of the operating method subsequent to FIG. 7.

FIGS. 6, 7, and 8 are explanatory drawings showing another example of the plug-and-play operating method in the serial communication system of FIG. 1. In FIGS. 3, 4, and 5, it is assumed that the single controlled module is newly coupled at a certain point in time. However, the multiple controlled modules may be newly coupled at a certain point in time. Specifically, for example, a unit having the multiple controlled modules is coupled to a bus via a connector or the like. Also in this case, the system of FIGS. 3, 4, and 5 is substantially usable.

Specifically, it is assumed that the motor module MDLm [2] and the sensor module MDLs [2] are newly coupled as shown in FIG. 6 (Step S101). As in FIG. 4, the motor module MDLm [2] and the sensor module MDLs [2] both output 'H' level through the GPIO interface GIF (Step S102). Subsequently, as in FIG. 4, the communication IF module MDLif detects 'H' level through the GPIO interface GIF [1] (Step S103) and then changes the GPIO interface GIF [1] to a sleep state (Step S104).

At this point, unlike in FIG. 4, only one of the motor module MDLm [2] and the sensor module MDLs [2] changes to a master state and the other of the modules changes to a slave state based on the arbitration function of the I2C standard (Step S105-2A). In the example of FIG. 6, the motor module MDLm [2] shifts to a master state. In this state, the motor module MDLm [2] operating in a master state searches for an address as in FIG. 5. As a result of the search, the motor module MDLm [2] can determine a unique address for the I2C bus BS1 [1] (Step S106-1).

Subsequently, as shown in FIG. 7, the motor module MDLm [2] transmits the determined address through the GPIO bus BS2 [1] as in FIG. 5 (Step S107). The communication IF module MDLif receives the address (Step S108). At the completion of the reception of the address, the communication IF module MDLif transmits the master declaration signal (start condition STC) to the I2C bus BS1 [1], recovers from a sleep state, and then changes to a master state as in FIG. 5 (Step S109).

Before the operation of step S107, the sensor module MDLs [2] stops transmission of 'H' level from the GPIO interface GIF so as to avoid contention of the GPIO bus BS2 [1], and then a high impedance is outputted (Step S106-2). The sensor module MDLs [2] may stop the transmission of 'H' level when changing to a slave state (Step S105-2B).

When the master declaration signal is transmitted from the communication IF module MDLif (Step S109), the motor module MDLm [2] changes to a slave state as in FIG. 5 (Step S110). Moreover, in this configuration, the controlled modules including the motor module MDLm [2] each have a bus coupling complete flag and so on in a register of the full I2C interface IIFf. The bus coupling complete flag indicates whether or not the address of of the module is recognized by the communication IF module MDLif (that is, whether the bus coupling is completed or not). For example, when changing to a slave state in step S110, the motor module MDLm [2] sets the bus coupling complete flag.

Subsequently, as shown in FIG. 8, the motor module MDLm [2] changes to a slave state in step S110 and then sets the GPIO interface GIF into an input state (Step S111). The sensor module MDLs [2] that operates in a slave state receives the master declaration signal (start condition STC) from the communication IF module MDLif without setting the bus coupling complete flag in step S109. In response to the signal, the sensor module MDLs [2] transmits 'H' level through the GPIO interface GIF (Step S112).

After that, the same operations as the motor module MDLm [2] of FIGS. 3, 4, and 5 are performed and then the bus coupling of the sensor module MDLs [2] is completed. At the completion of the bus coupling, the sensor module MDLs [2] sets the bus coupling complete flag as described in step S110 in FIG. 7 and sets the GPIO interface GIF into an input state as described in step S111.

<<An Application Example of the Serial Communication System>>

Figure 9:
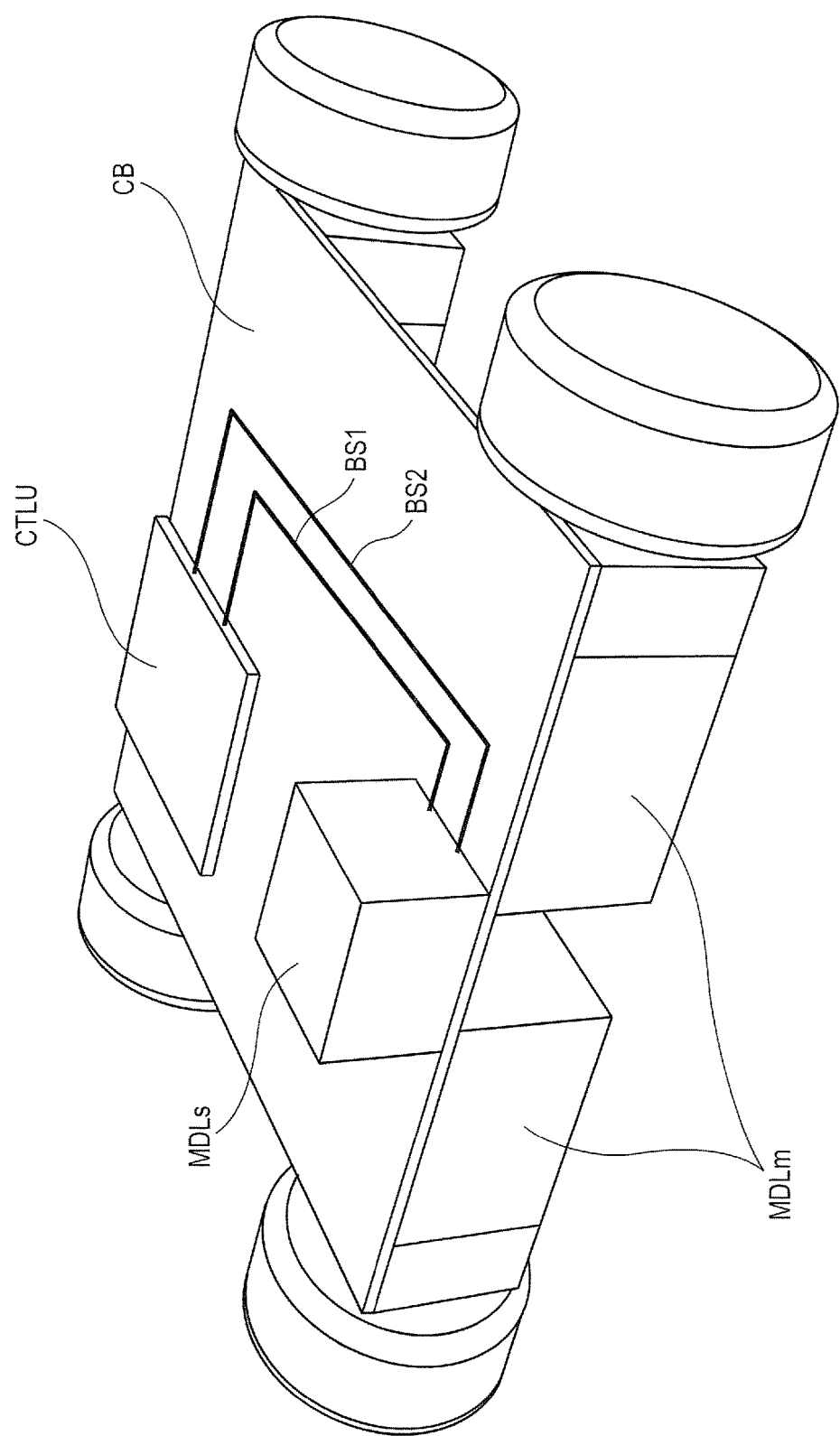
FIG. 9 is a full view schematically showing a configuration example of a vehicle robot including the serial communication system of FIG. 1.

FIG. 9 is a full view schematically showing a configuration example of a vehicle robot including the serial communication system of FIG. 1. The vehicle robot in FIG. 9 has the control unit CTLU, the sensor module MDLs, and the motor modules MDLm on a chassis substrate CB having four tires. The sensor module MDLs and the motor modules MDLm are detachable from the chassis substrate CB via connectors or the like.

The chassis substrate CB includes the I2C bus BS1 and the GPIO bus BS2. The control unit CTLU, the sensor module MDLs, and the motor modules MDLm are coupled to one another via the I2C bus BS1 and the GPIO bus BS2. The motor module MDLm controls, but not exclusively, the rotation speed and rudder angle of the tire while the sensor module MDLs detects the presence or absence of an obstacle. The control unit CTLU controls the motor module MDLm according to the detection result of the sensor module MDLs, controlling a movement of the vehicle robot.

The example of the representative controlled modules included in the vehicle robot was described. Actually, a larger number of controlled modules may be mounted depending on the application of the vehicle robot (e.g., a transport robot or a cleaning robot). The control unit CTLU needs to control the controlled modules in a predetermined control period. For example, in the robot development process and the functional expansion process after the development, user convenience can be improved using the plug-and-play function of the first embodiment.

Typically, the system configuration can be flexibly or easily changed using the serial communication system, the communication control unit, and the electronic device according to the first embodiment.

Second Embodiment

In a second embodiment, the communication IF module (communication control unit) and the controlled modules (electronic devices) in the first embodiment will be specifically described below.

<<Configuration and Operation of the Communication IF Module (Communication Control Unit)>>

Figure 10:
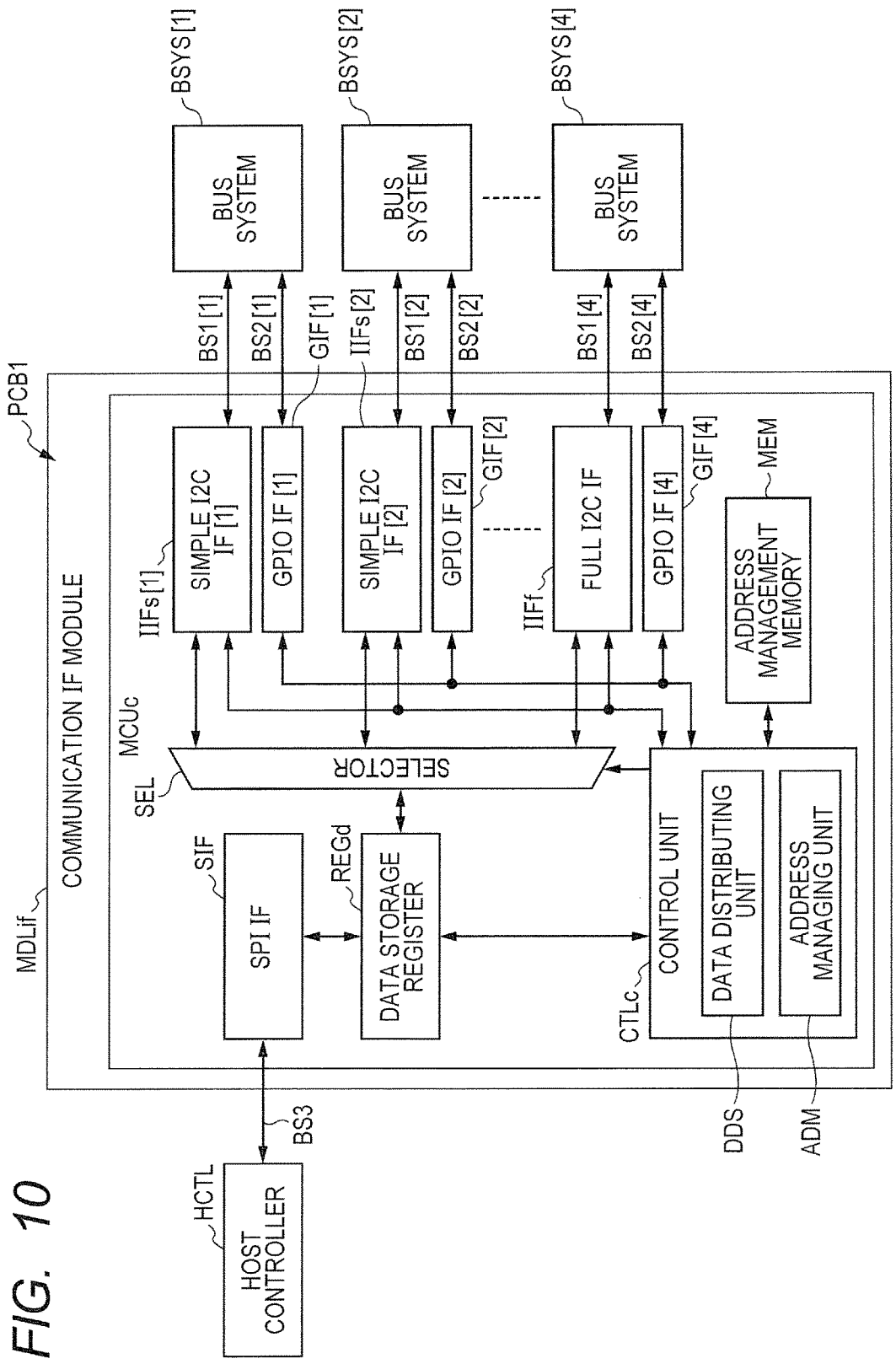
FIG. 10 is a block diagram showing a configuration example of the main part of a communication control unit according to a second embodiment of the present invention.

FIG. 10 is a block diagram showing a configuration example of the main part of the communication control unit according to the second embodiment of the present invention. A communication IF module (communication control unit) MDLif in FIG. 10 includes, for example, a control device (semiconductor chip) MCUc, e.g., a microcontroller mounted on a circuit board PCB1. Moreover, the circuit board PCB1 has a connector (not shown) for coupling to a host controller HCTL and connectors (not shown) for coupling to bus systems BSYS [1] to BSYS [4].

As shown in FIG. 1, the control device MCUc includes simple I2C interfaces IIFs [1] to IIFs [3] (IIFs [3] is not shown) and a full I2C interface IIFf that serve as first serial interfaces and GPIO interfaces GIF [1] to GIF [4] that serve as second serial interfaces. Additionally, the control device MCUc includes an SPI interface (host interface) SIF, a data storage register REGd, a control unit CTLc, a selector SEL, and an address management memory MEM.

As described above, schematically, the I2C interface (first serial interface) IIF transmits a command (first command), which contains an address of one of the controlled modules (electronic devices) in the bus system BSYS, to an I2C bus (first serial bus) BS1 so as to control the controlled module. Moreover, schematically, the GPIO interface (second serial interface) GIF receives a signal from one of the controlled modules.

The SPI interface (host interface) SIF carries out serial communications with the host controller (host control unit) HCTL via an SPI bus BS3. As described above, the host controller HCTL issues a control command (second command), which contains device identifiers for identifying the respective control modules, to the controlled modules in the bus system BSYS. The SPI interface SIF receives the control command and stores the command in the data storage register REGd.

The control unit CTLc includes a data distributing unit DDS and an address managing unit ADM. The control unit CTLc controls the operation of the overall control device MCUc including the I2C interface IIF and the GPIO interface GIF. The control unit CTLc is mainly configured using, for example, program processing of a processor.

The address managing unit ADM manages the addresses of the controlled modules in the bus system BSYS by means of the address management memory MEM. Specifically, the address management memory MEM stores the correlations among the device identifiers contained in the control command (second command), bus identifiers for identifying the respective I2C buses BS1 (I2C interfaces IIF), and slave addresses ADD in the I2C buses BS1 identified by the bus identifiers.

As indicated by, for example, step S107 in FIG. 5, when receiving the determined slave address ADD through the GPIO bus (e.g., BS2 [1]) from the controlled module, the address managing unit ADM registers, in the address management memory MEM, the correlation between the slave address ADD and the bus identifier of the I2C bus (BS1 [1]) for the GPIO bus. At this point, the address managing unit ADM associates address information on the controlled module with a predetermined device identifier on the address management memory MEM and notifies the host controller HCTL of the device identifier through the SPI interface SIF.

When receiving the control command from the host controller HCTL, the data distributing unit DDS transmits the command (first command) containing the predetermined slave address ADD, to the I2C bus BS1 through the predetermined I2C interface IIF based on the correlations of the address management memory MEM. Specifically, the data distributing unit DDS recognizes the device identifier of the control command (second command) stored in the data storage register REGd, controls the selector SEL based on the correlations of the address management memory MEM, and transmits the control command to one of the I2C interfaces IIF. At this point, the data distributing unit DDS also converts the device identifier to the slave address ADD.

When receiving data DT in the I2C interface IIF from the controlled module in response to a reading command in the I2C bus BS1, the control unit CTLc transmits the data DT to the host controller HCTL through the SPI interface SIF.

<<The Configuration and Operation of the Motor Module (Electronic Device)>>

Figure 11:
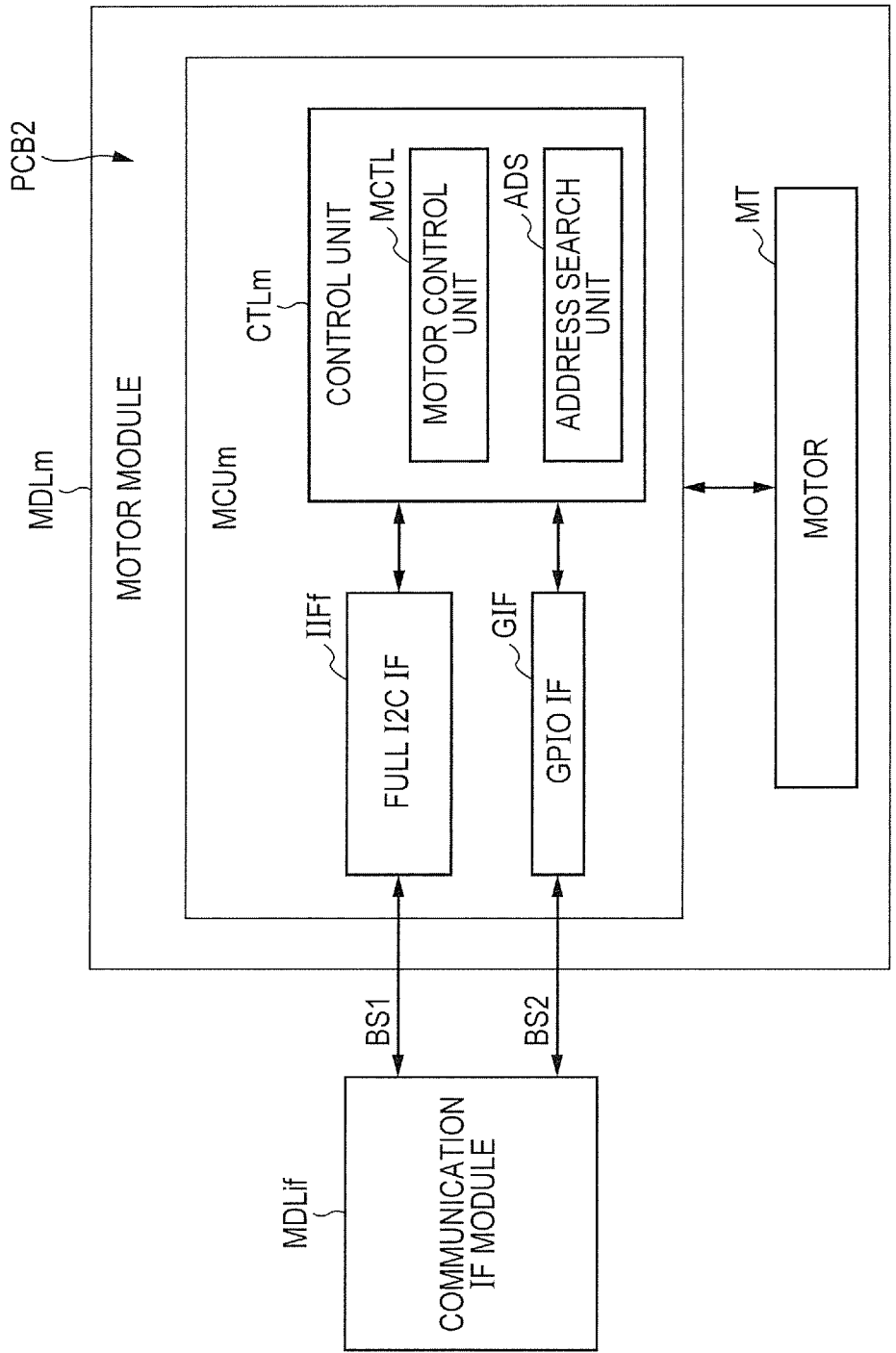
FIG. 11 is a block diagram showing a configuration example of the main part of an electronic device according to the second embodiment of the present invention.

FIG. 11 is a block diagram showing a configuration example of the main part of the electronic device according to the second embodiment of the present invention. In this example, the controlled module (electronic device) is a motor module MDLm. The motor module MDLm in FIG. 11 includes, for example, a control device (semiconductor chip) MCUm, e.g., a microcontroller and a motor MT on a circuit board PCB2. Furthermore, the circuit board PCB2 has connectors (not shown) for coupling to the I2C bus BS1 and the GPIO bus BS2 and a motor driver or the like (not shown) for driving a motor MT.

As shown in FIG. 11, the control device MCUm includes a full I2C interface IIFf serving as a first serial interface and a GPIO interface GIF serving as a second serial interface. Additionally, the control device MCUm includes a control unit CTLm. As described above, schematically, the full I2C interface IIFf receives the command (first command) containing addresses from the I2C bus (first serial bus) BS1. If the received address is the address of the full I2C interface IIFf, the full I2C interface IIFf outputs an acknowledgement ACT to the I2C bus BS1. Moreover, schematically, the GPIO interface GIF outputs a signal to the GPIO bus BS2.

The control unit CTLm includes a motor control unit MCTL and an address search unit ADS. The control unit CTLm controls the operation of the overall control device MCUm including the full I2C interface IIFf and the GPIO interface GIF. The control unit CTLm is mainly configured using, for example, program processing of a processor. The motor control unit MCTL controls the motor MT through a motor driver or the like in response to the command (first command) received by the full I2C interface IIFf. As described in the first embodiment, the address search unit ADS performs various kinds of plug-and-play processing typified by address search.

<<The Configuration and Operation of the Full I2C Interface>>

Figure 12:
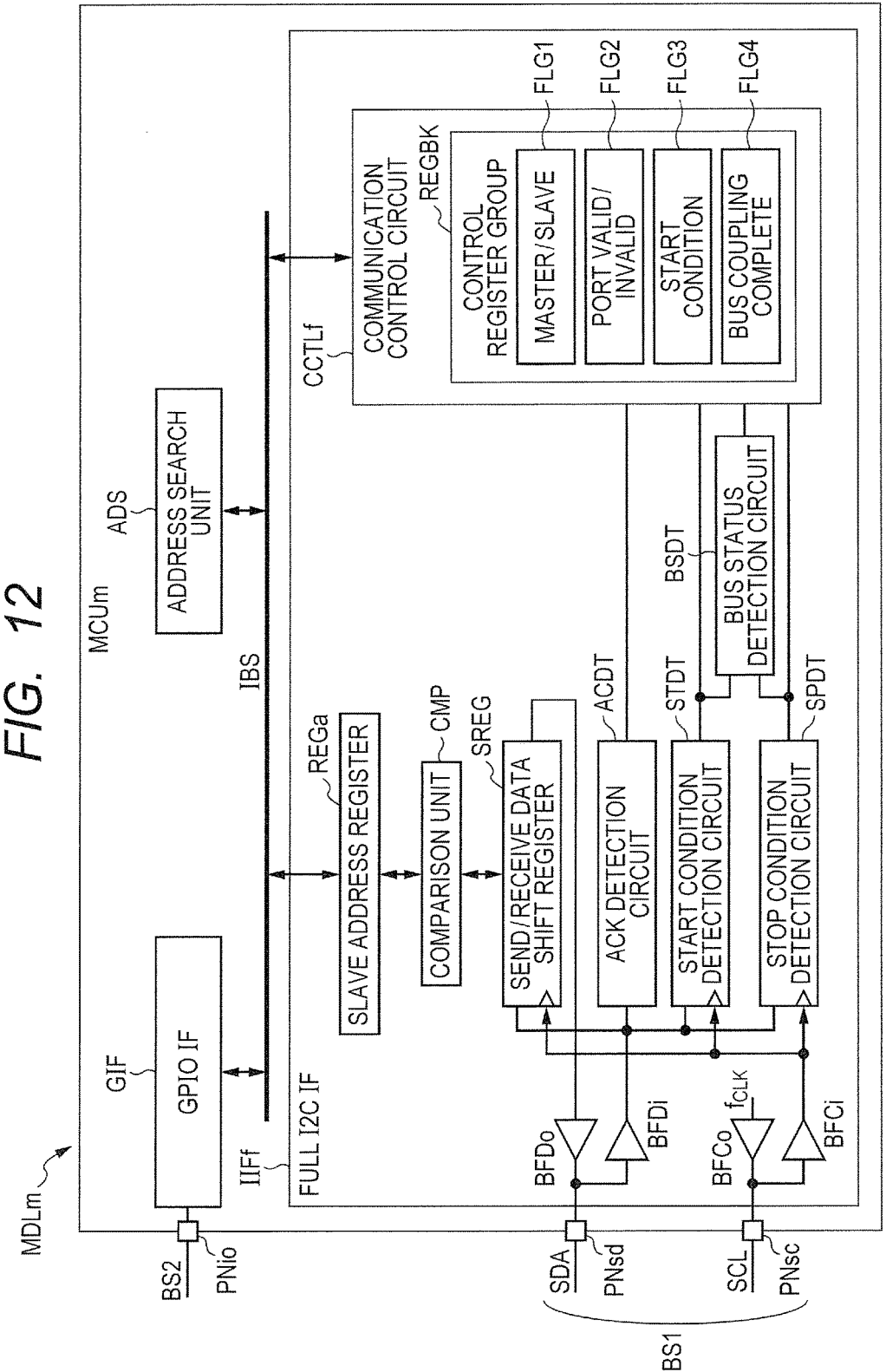
FIG. 12 is a block diagram showing a configuration example of a main part around a full I2C interface in the electronic device of FIG. 11.

FIG. 12 is a block diagram showing a configuration example of a main part around the full I2C interface in the electronic device of FIG. 11. In this example, the full I2C interface of the controlled module (electronic device) will be described below. The full I2C interface of the communication IF module MDLif is identical in configuration and operation to that of the controlled module.

The full I2C interface IIFf in FIG. 12 includes a slave address register REGa, a comparison unit CMP, a send/receive data shift register SREG, an ACK detection circuit ACDT, a start condition detection circuit STDT, a stop condition detection circuit SPDT, a bus state detection circuit BSDT, and a communication control circuit CCTLf. The full I2C interface IIFf further includes a data transmission buffer BFDo, a data reception buffer BFDi, a clock transmission buffer BFCo, and a clock reception buffer BFCi.

The data transmission buffer BFDo and the data reception buffer BFDi are connected to an external terminal PNsd of the control device MCUm while the clock transmission buffer BFCo and the clock reception buffer BFCi are connected to an external terminal PNsc of the control device MCUm. The external terminal PNsd is connected to a data wire (SDA) of the I2C bus BS1 while the external terminal PNsc is connected to a clock wire (SCL) of the I2C bus BS1. In an operation in a master operation, the full I2C interface IIFf transmits a predetermined clock signal ($f_{CLK}$) to the clock wire (SCL) of the I2C bus BS1 through the clock transmission buffer BFCo. The clock reception buffer BFCi receives the clock signal SCL on the clock wire of the I2C bus BS1.

The slave address register REGa stores the slave address ADD of the register when operating in a slave state. The send/receive data shift register SREG performs a shifting operation in synchronization with the clock signal SCL received by the clock reception buffer BFCi, enabling conversion between parallel data and serial data. The send/receive data shift register SREG transmits stored parallel data in bits to the data transmission buffer BFDo, and receives serial data (data signal SDA) in bits received by the reception buffer BFDi.

When operating in a slave state, the comparison unit CMP compares the data signal SDA received by the send/receive data shift register SREG and the slave address ADD stored in the slave address register REGa, and decides whether the command (first command) has been issued for the comparison unit CMP or not. The ACK detection circuit ACDT detects a positive signal ACK (or a negative signal NAK) in FIG. 2 from the data signals SDA received by the data reception buffer BFDi.

The start condition detection circuit STDT and the stop condition detection circuit SPDT monitor the data signal SDA received by the data reception buffer BFDi and the clock signal SCL received by the clock reception buffer BFCi, and detect a start condition STC and a stop condition SPC in FIG. 2. The bus state detection circuit BSDT decides whether the I2C bus BS1 is opened or not or mediates contention of the start condition STC (whether the bus state detection circuit BSDT has been placed into a master state or not) based on the detection results of the start condition detection circuit STDT and the stop condition detection circuit SPDT.

The communication control circuit CCTLf includes a control register group REGBK and controls the overall full I2C interface IIFf based on the set values of control registers included in the control register group REGBK. The control register group REGBK includes a flag FLG1 for identifying a master state and a slave state, a flag FLG2 that controls valid/invalid of the interface, a flag FLG3 at transmission of the start condition STC, and a bus coupling complete flag FLG4.

The flag FLG1 is controlled based on the detection result of the bus state detection circuit BSDT. As indicated by step S104 in FIG. 4, the flag FLG2 is used in a change to a sleep state. As indicated by step S109 and so on in FIG. 5, the flag FLG3 is used in the transmission of the start condition STC. As indicated by step S110 and so on in FIG. 7, the bus coupling complete flag FLG4 is used when it is decided whether the bus has been coupled or not.

The full I2C interface IIFf is connected to, for example, the GPIO interface GIF and the address search unit ADS via an internal bus in the control device MCUm. The GPIO interface GIF is connected to the GPIO bus BS2 via an external terminal PNio of the control device MCUm.

<<The Configuration and Operation of the Simple I2C Interface>>

Figure 13:
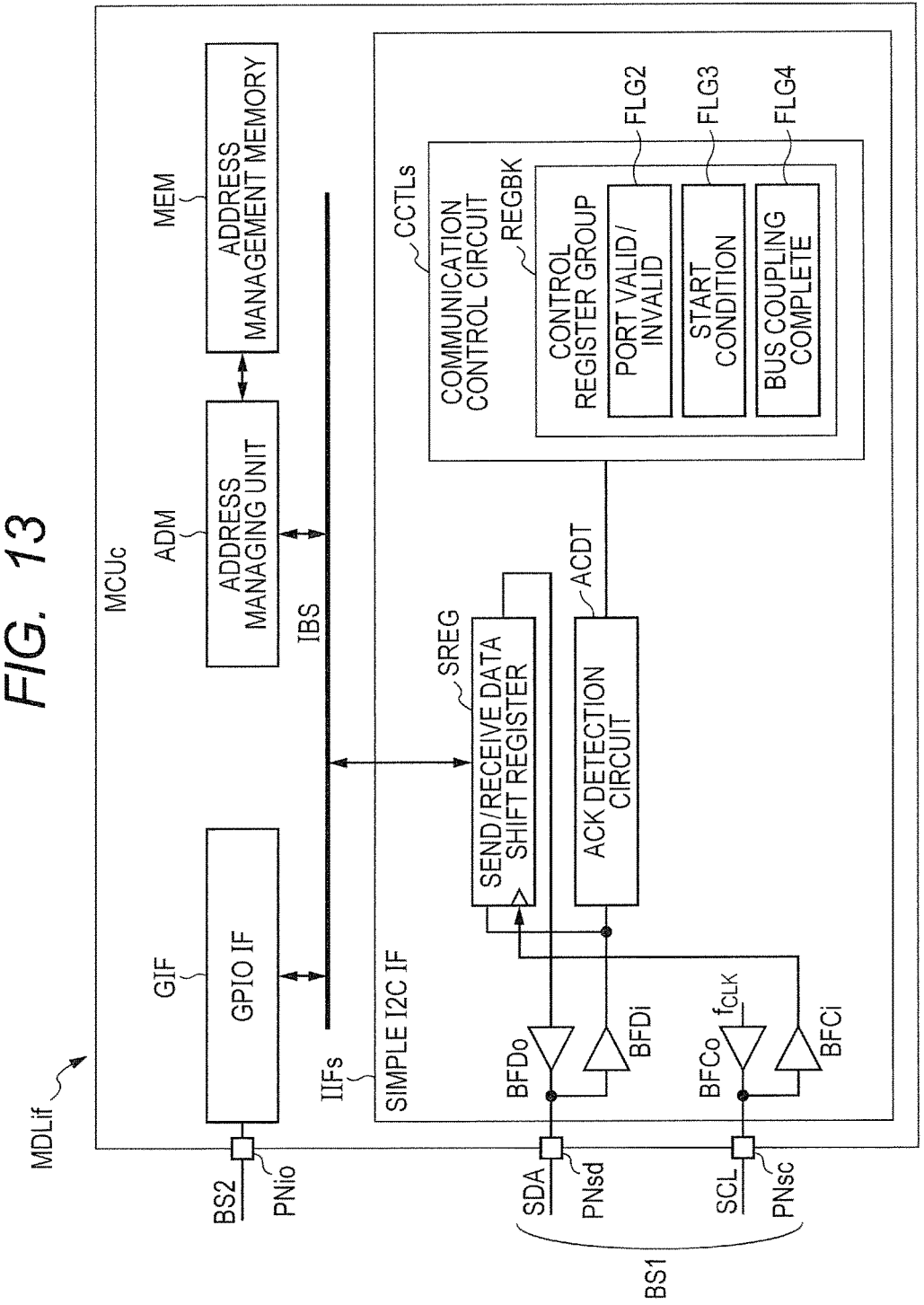
FIG. 13 is a block diagram showing a configuration example of a main part around a simple I2C interface in the communication control unit of FIG. 10.

FIG. 13 is a block diagram showing a configuration example of a main part around the simple I2C interface in the communication control unit of FIG. 10. The simple I2C interface IIFs in FIG. 13 includes a send/receive data shift register SREG, an ACK detection circuit ACDT, a communication control circuit CCTLs, a data transmission buffer BFDo, a data reception buffer BFDi, a clock transmission buffer BFCo, and a clock reception buffer BFCi. In other words, circuit parts only used for operations in a slave state are absent in the simple I2C interface IIFs in FIG. 13 unlike in the full I2C interface IIFf in FIG. 12.

As in FIG. 12, the communication control circuit CCTLs has a control register group REGBK. However, the flag FLG1 for identifying a master state and a slave state is absent in the control register group REGBK unlike in the case of FIG. 12. The control register group REGBK in FIG. 12 actually has a larger number of registers (flags) many of which are only used in a slave state. The registers (flags) only used in a slave state are omitted in the control register group REGBK of FIG. 13. Accordingly, circuit parts for processing based on the omitted registers (flags) are omitted in the communication control circuit CCTLs of FIG. 13 unlike in the communication control circuit CCTLf of FIG. 12.

The simple I2C interface IIFs is connected to, for example, the GPIO interface GIF and the address managing unit ADM via an internal bus IBS in a control device MCUc. The address managing unit ADM can access the address management memory MEM. The GPIO interface GIF is connected to the GPIO bus BS2 via an external terminal PNio of the control device MCUc.

<<Address Management for the Communication IF Module (Communication Control Unit)>>

Figure 14:
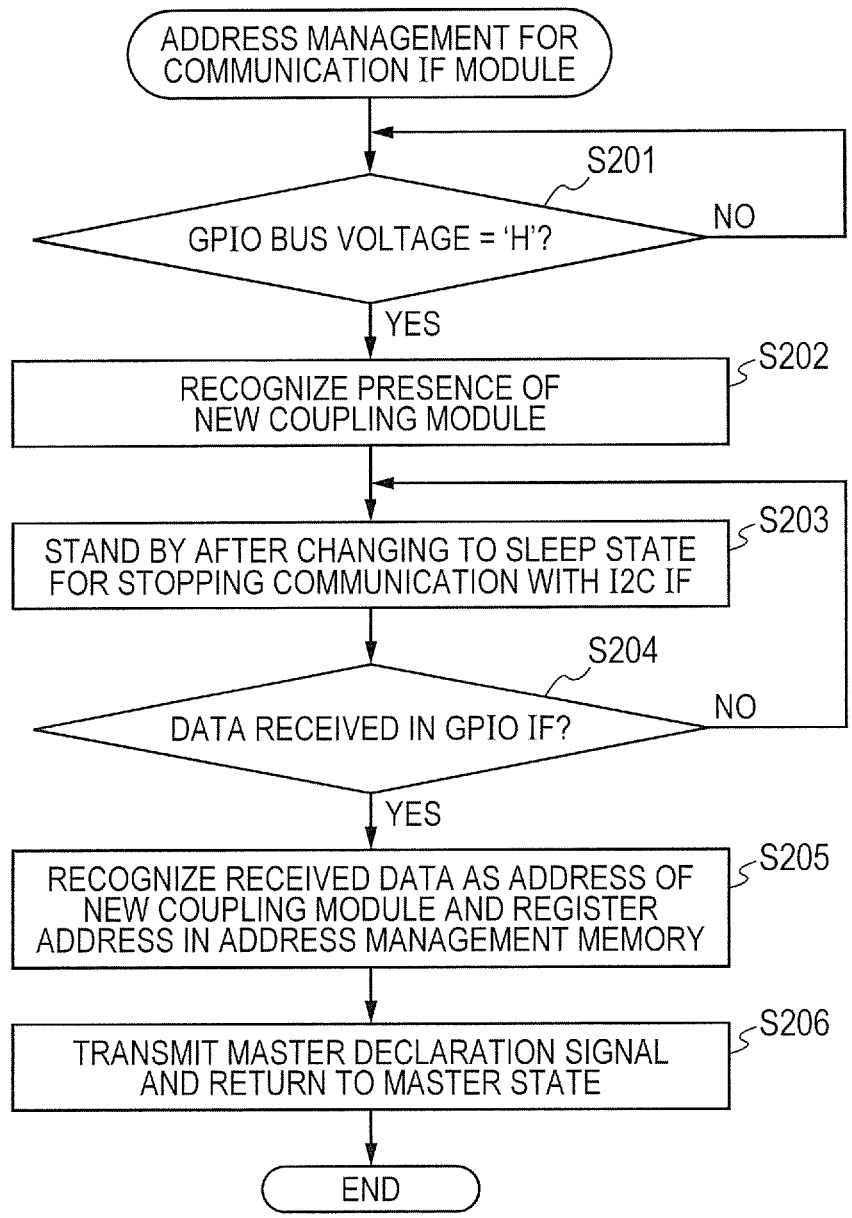
FIG. 14 is a flowchart showing an example of the processing contents of an address managing unit in the communication control unit of FIGS. 10 and 13.

FIG. 14 is a flowchart showing an example of the processing contents of the address managing unit in the communication control unit of FIGS. 10 and 13. In step S201, the address managing unit ADM first monitors the GPIO interfaces GIF and then shifts to step S202 when 'H' level (first signal) is received by one of the GPIO interfaces GIF. In step S202, the address managing unit ADM recognizes the presence of the newly coupled controlled module.

Subsequently, the address managing unit ADM changes the I2C interface IIF to a sleep state so as to correspond to the GPIO interface GIF that has received 'H' level (Step S203). Specifically, the address managing unit ADM sets the flag FLG2 of FIG. 13. Thus, the I2C interface IIF stops communications with the I2C bus BS1 and is placed into a standby state. The address managing unit ADM keeps the standby state of step S203 until data (that is, the slave address ADD) is received by the GPIO interface GIF (step S204).

When the data (slave address ADD) is received by the target GPIO interface GIF, the address managing unit ADM recognizes the received data as the slave address ADD of the newly coupled controlled module and then registers the data in the address management memory MEM (step S205). After that, the address managing unit ADM returns from a sleep state, transmits the master declaration signal (that is, the start condition STC) to the target I2C bus BS1 through the I2C interface IIF, and then returns to a master state (step S206). Specifically, the address managing unit ADM deletes the flag FLG2 of FIG. 13 and sets the flag FLG3.

<<Address Search for the Controlled Module (Electronic Device)>>

Figure 15:
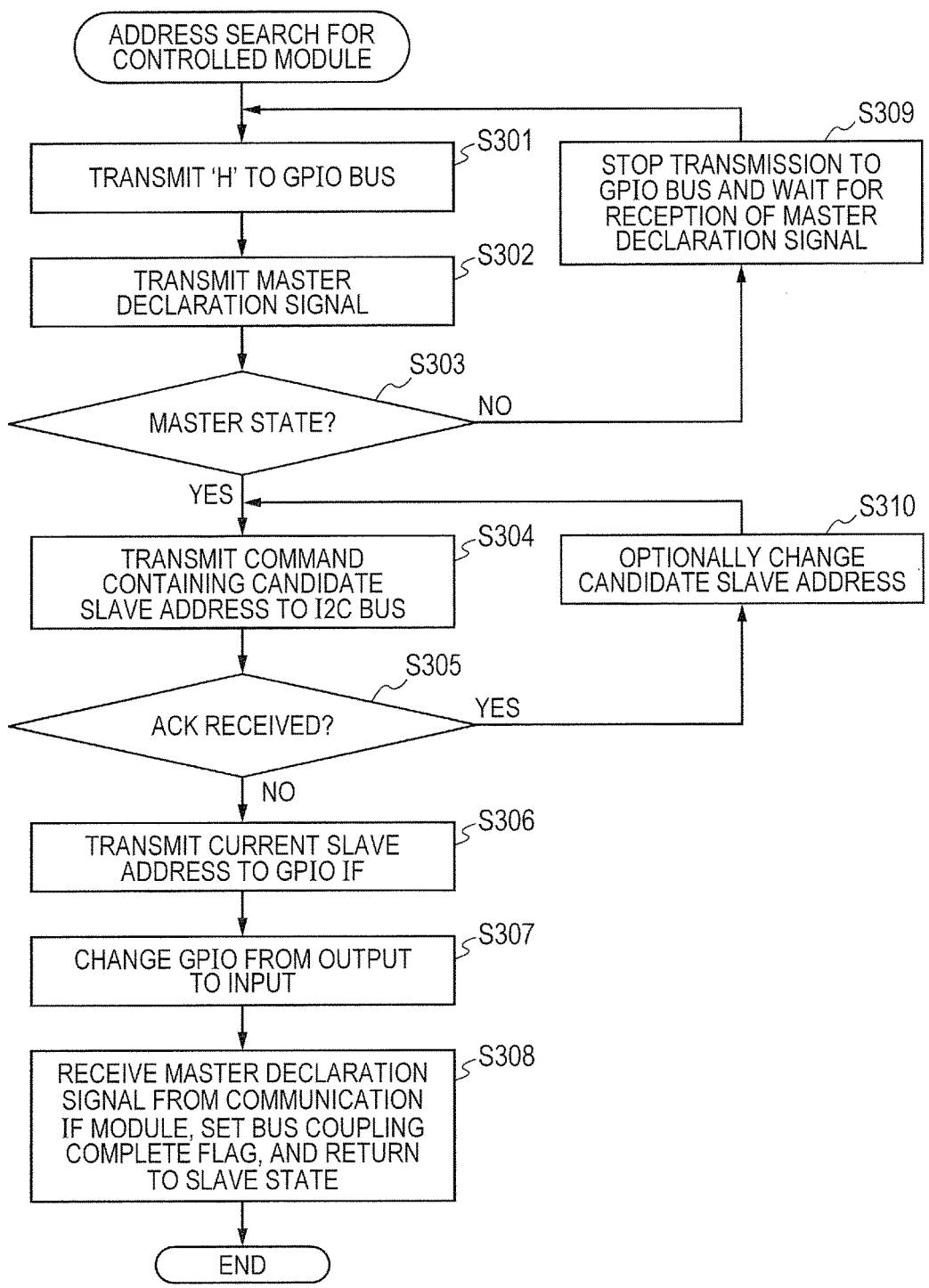
FIG. 15 is a flowchart showing an example of the processing contents of an address search unit in the electronic device of FIGS. 11 and 12.

FIG. 15 is a flowchart showing an example of the processing contents of the address search unit in the electronic device of FIGS. 11 and 12. The address search unit ADS coupled to the I2C bus BS1 and the GPIO bus BS2 first transmits 'H' level (first signal) to the GPIO bus BS2 through the GPIO interface GIF (step S301 (first processing)). Subsequently, the address search unit ADS transmits the master declaration signal to the I2C bus BS1 through the full I2C interface IIFf (step S302).

After that, the address search unit ADS decides whether the address search unit ADS is placed in a master state or not (step S303). Specifically, the decision of the address search unit ADS depends on the detection result of the bus state detection circuit BSDT in FIG. 12. In the case of a master state, the address search unit ADS transmits the command (first command) containing the candidate slave address ADD of the address search unit ADS to the I2C bus BS1 through the full I2C interface IIFf (step S304). Specifically, the address search unit ADS transmits, for example, the slave address ADD and a read/write selection signal (R/W) (e.g., a writing command) that are shown in FIG. 2.

When receiving the acknowledgment ACK in response to the command (first command) (step S305), the address search unit ADS optionally changes the candidate slave address ADD (e.g., increments by one) and then returns to the processing of step S304 (step S310). Through the processing (second processing) of steps S304, S305, and S310, the address search unit ADS searches for a slave address (that is, a unique slave address) ADD where the acknowledgment ACK is not received in response to the command (first command).

If the acknowledgment ACK is not received in step S304, the address search unit ADS transmits the current slave address ADD (that is, the slave address as a search result) to the GPIO bus BS2 through the GPIO interface GIF (S306 (third processing)). After that, the address search unit ADS changes the GPIO interface GIF from an output state to an input state (step S307). The address search unit ADS receives the master declaration signal from the communication IF module MDLif, sets the bus coupling complete flag (FLG4 in FIG. 12), and then returns to a slave state.

If the address search unit ADS is not placed in a master state in step S303, the address search unit ADS stops 'H' level transmission to the GPIO bus BS2 and waits for, in a slave state, the reception of the master declaration signal from the communication IF module MDLif (step S309). Subsequently, if the master declaration signal is received from the communication IF module MDLif, the address search unit ADS performs processing in step S301 again.

The same effects as in the first embodiment can be obtained using the communication control unit and the electronic device according to the second embodiment. As shown in FIGS. 12 and 13, particularly, the circuit area and cost can be reduced using the simple I2C interface IIFs or as shown in FIG. 10, the host controller HCTL and the communication IF module MDLif are advantageously separated from each other. Specifically, the control command (second command) from the host controller HCTL is automatically distributed by the communication IF module MDLif, allowing a user to develop a desired control system only using the development environment of the host controller HCTL. This achieves higher user convenience (that is, ease of development).

Third Embodiment

<<The Configuration of a Serial Communication System (Modification [1])>>

Figure 16:
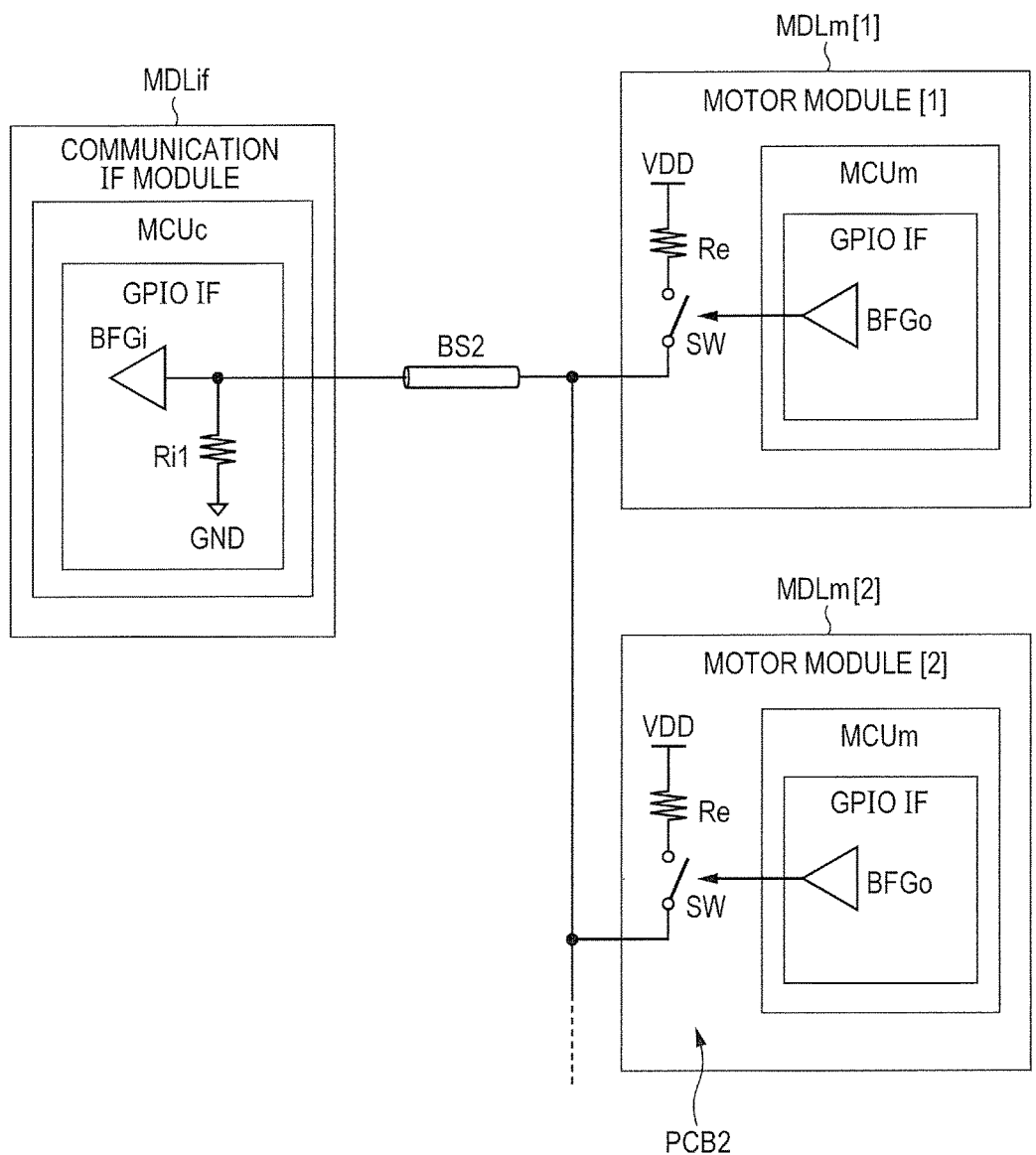
FIG. 16 is a schematic diagram showing a configuration example of the main part of a serial communication system according to a third embodiment of the present invention.
Figure 17:
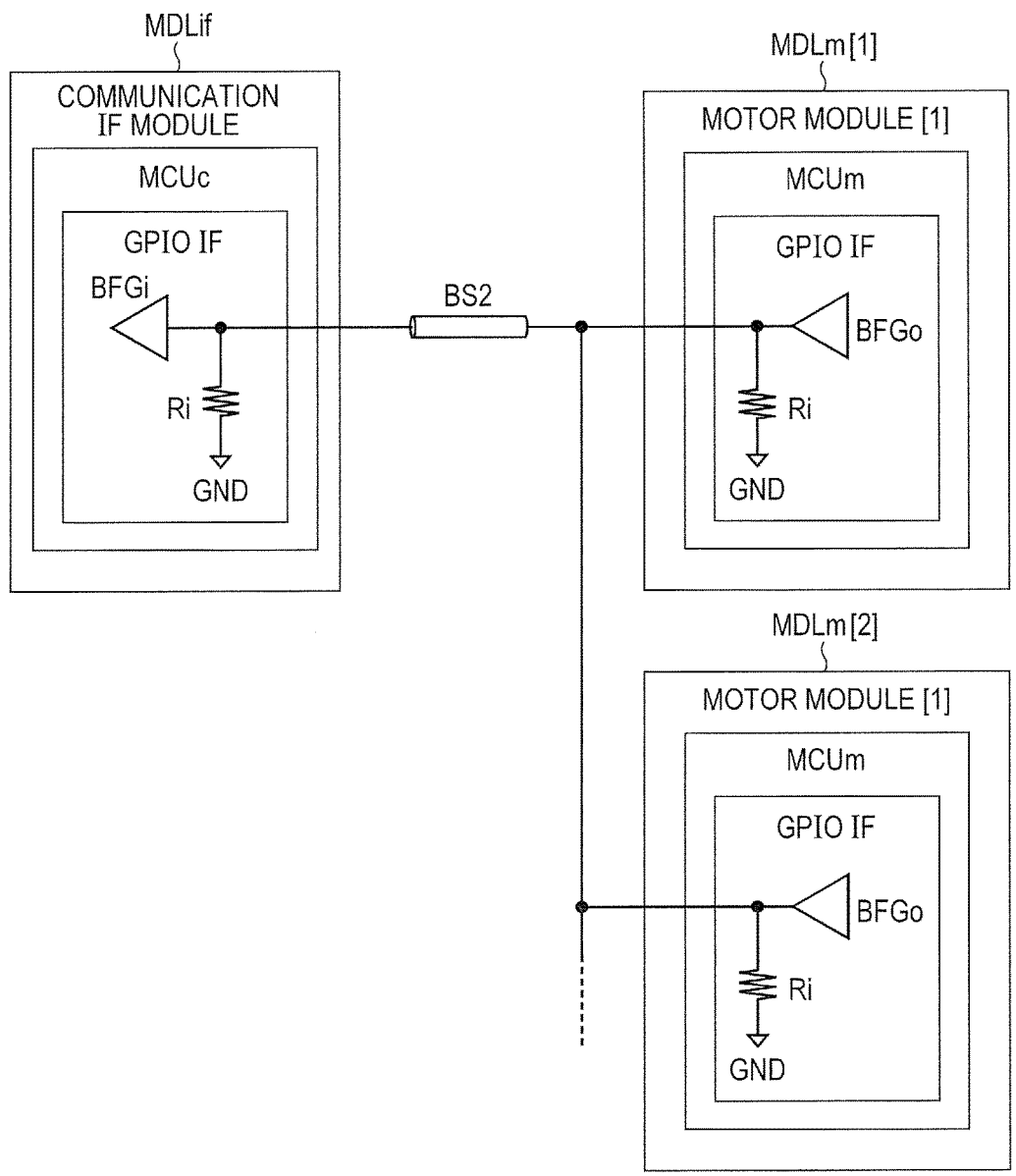
FIG. 17 is a schematic diagram showing a configuration example of the main part of a serial communication system examined as a comparative example of FIG. 16.

FIG. 16 is a schematic diagram showing a configuration example of the main part of a serial communication system according to a third embodiment of the present invention. FIG. 17 is a schematic diagram showing a configuration example of a main part of a serial communication system examined as a comparative example of FIG. 16. In the configuration examples of FIGS. 16 and 17, a communication IF module MDLif is coupled to a plurality of controlled modules (in this configuration, motor modules MDLm [1], MDLm [2], and so on) via a GPIO bus BS2.

As shown in FIG. 17, typically, a GPIO interface GIF can couple a pull-down resistor/pull-down resistor (in this configuration, a pull-down resistor Ri) according to an initial setting in an interface. For example, it is assumed that the GPIO interface GIF in the motor module MDLm [1] transmits 'H' level through a transmission buffer BFGo. In this case, a current passes through the pull-down resistor Ri in each of the modules (MDLif, MDLm [1], MDLm [2], and so on) from the transmission buffer BFGo. An increase in the number of controlled modules may deteriorate power consumption and the drive capability of the transmission buffer BFGo.

In FIG. 16, an external switch SW and an external resistor Re are mounted on a circuit board PCB2 of the controlled module (motor modules MDLm [1], MDLm [2], and so on). The external resistor Re may be omitted. One end of the external switch SW is connected to the GPIO bus BS2 while the other end of the external resistor Re receives a power supply voltage (fixed voltage) VDD supplied through the external resistor Re. Moreover, the GPIO interface GIF in the controlled module controls on/off of the external switch SW so as to communicate with the GPIO bus BS2.

Thus, for example, if the GPIO interface GIF in the motor module MDLm [1] transmits 'H' level through the transmission buffer BFGo, a current only passes through the pull-down resistor Ri in the communication IF module MDLif unlike in the case of FIG. 17. This can reduce power consumption without deteriorating the drive capability of the transmission buffer BFGo.

Fourth Embodiment

<<The Configuration of a Serial Communication System (Modification [2])>>

Figure 18:
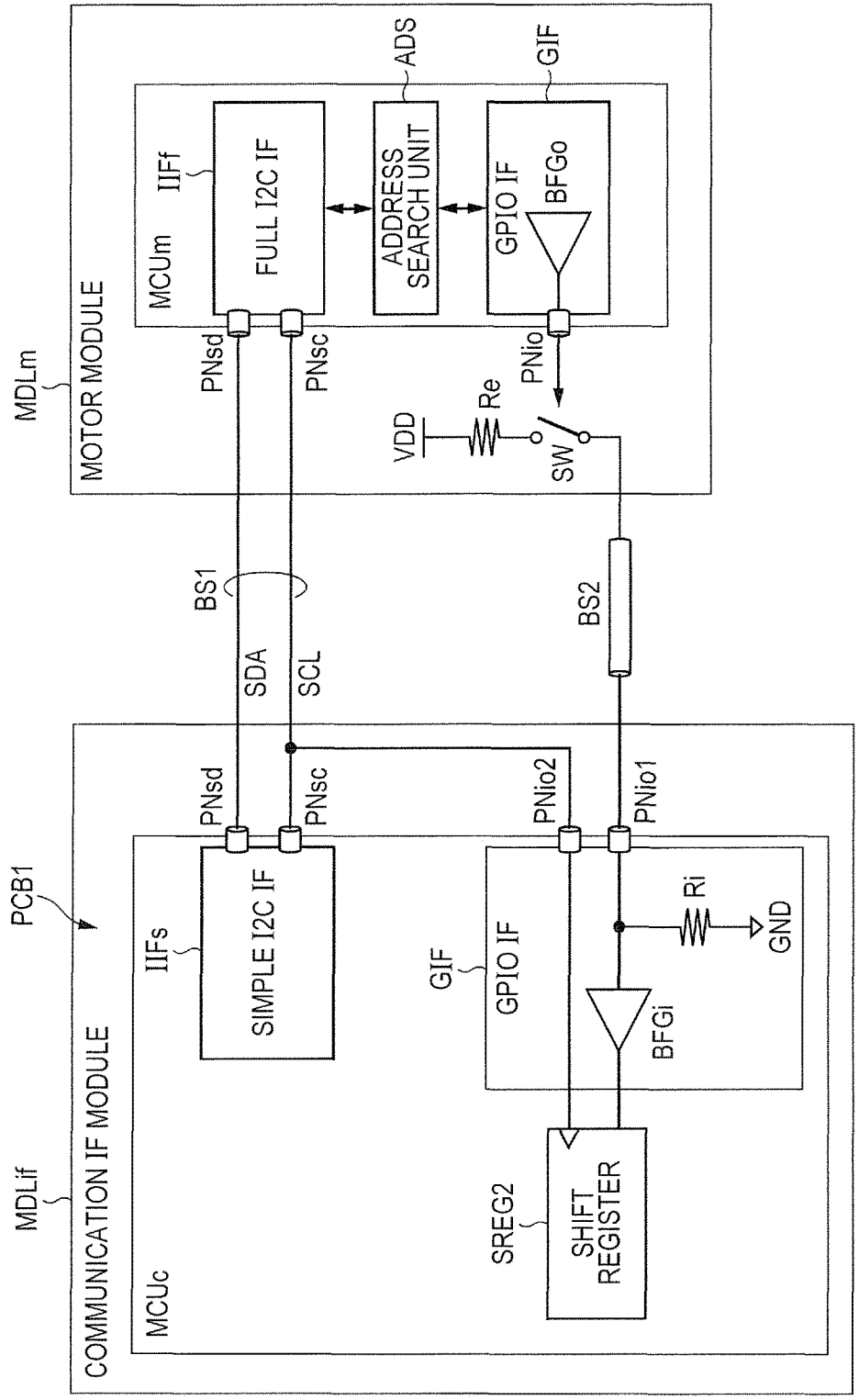
FIG. 18 is a schematic diagram showing a configuration example of the main part of a serial communication system according to a fourth embodiment of the present invention.

FIG. 18 is a schematic diagram showing a configuration example of the main part of a serial communication system according to a fourth embodiment of the present invention. In the configuration example of FIG. 18, a communication IF module MDLif and a controlled module (a motor module MDLm in this configuration) are coupled to each other via a I2C bus BS1 and a GPIO bus BS2. A control device MCUc in the communication IF module MDLif includes an external terminal PNio2 in addition to an external terminal PNsd and an external terminal PNsc that are connected to a data wire (SDA) and a clock wire (SCL), respectively, and an external terminal PNio1 connected to the GPIO bus BS2.

The external terminal PNio2 is coupled to the external terminal PNsc via a circuit board PCB1 of the communication IF module MDLif. The control device MCUc of the communication IF module MDLif includes a shift register SREG2 composed of hardware or a combination of hardware and software. The shift register SREG2 acquires serial data, which is received from the GPIO bus BS2 through a GPIO interface GIF, in synchronization with a clock signal SCL received by the external terminal PNio2.

In a control device MCUm of the controlled module (motor module MDLm), for example, an address search unit ADS in a control unit CTLm of FIG. 11 performs the following processing: the address search unit ADS transmits a slave address ADD as a search result to the GPIO bus BS2 in, for example, step S306 of FIG. 15 and transmits the clock signal SCL through the full I2C interface IIFf to the clock wire included in the I2C bus BS1 in synchronization with the transmission. Thus, the communication IF module MDLif can acquire the slave address ADD into the shift register SREG2.

Using this system can equivalently carry out synchronous communications with the single GPIO bus BS2 without particularly increasing the number of wires in the serial communication system. This can reduce the size or cost of the serial communication system. Moreover, the synchronous communications may improve reliability in communications through the GPIO bus BS2.

Fifth Embodiment

<<The Configuration of a Serial Communication System (Modification) [3]>>

Figure 19:
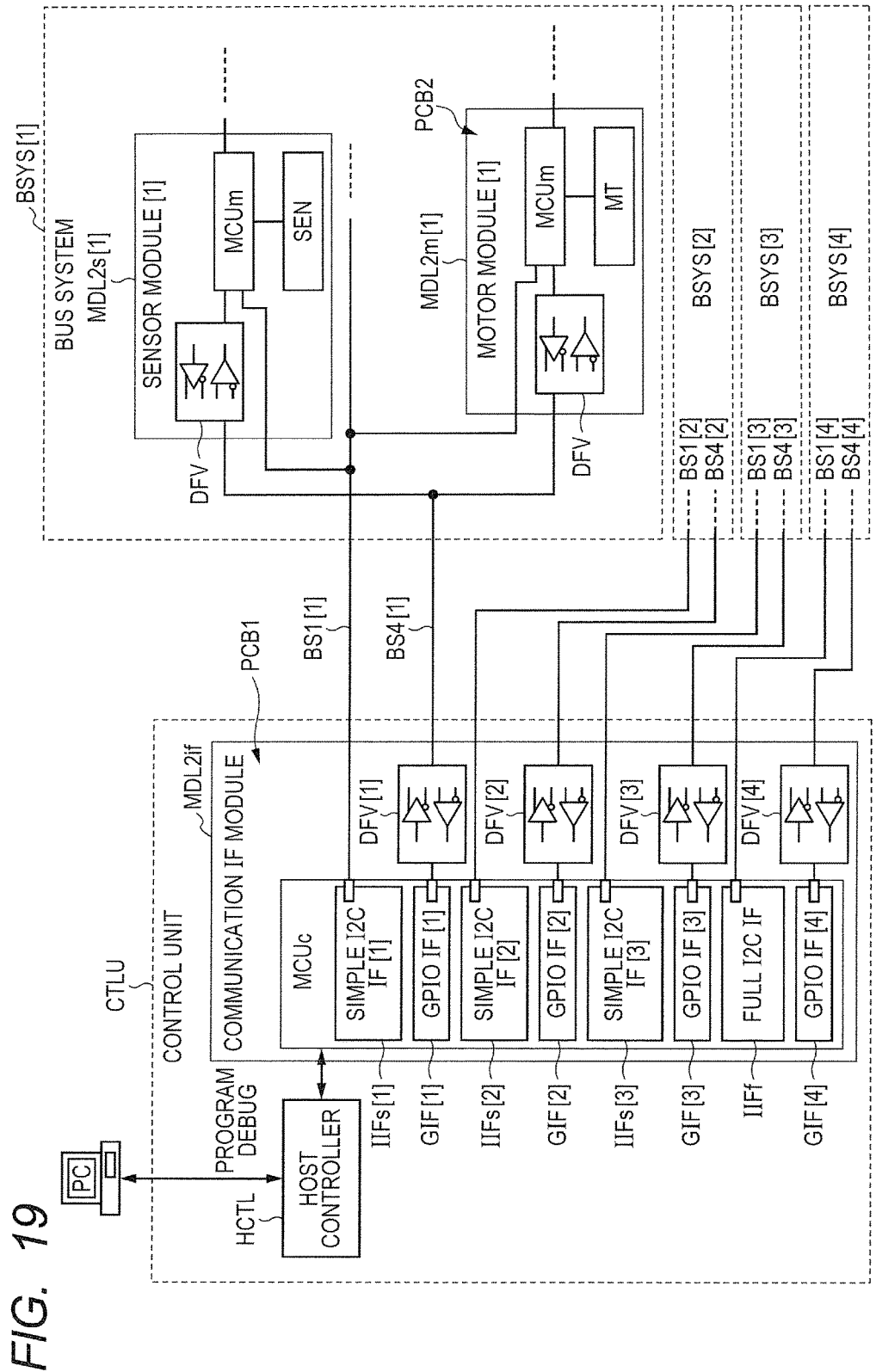
FIG. 19 is a schematic diagram showing a configuration example of the main part of a serial communication system according to a fifth embodiment of the present invention.

FIG. 19 is a schematic diagram showing a configuration example of the main part of a serial communication system according to a fifth embodiment of the present invention. In the configuration example of FIG. 19, a communication IF module MDL2if is coupled to controlled modules in bus systems BSYS [1] to BSYS [4] via I2C buses BS1[1] to BS1[4] and differential buses BS4 [1] to BS4 [4]. The configuration of the controlled module, typified by the motor module MDL2m [1] in the bus system. BSYS [1], will be described below.

Four differential bus drivers DFV [1] to DFV [4] are mounted on a circuit board PCB1 of the communication IF module MDL2if. The four differential bus drivers DFV [1] to DFV [4] convert single data, which is transmitted from the GPIO interfaces GIF [1] to GIF [4] of a control device MCUc, into differential data and then transmit the data to the differential buses BS4 [1] to BS4 [4]. Conversely, the four differential bus drivers DFV [1] to DFV [4] convert differential data, which is received from the differential buses BS4 [1] to BS4 [4], into single data and then transmits the data to the GPIO interfaces GIF [1] to GIF [4].

Similarly, the differential bus driver DFV is mounted on the circuit board PCB2 of the motor module MDL2m [1]. THe differential bus driver DFV converts single data, which is transmitted from the GPIO interface GIF (not shown) of a control device MCUm, into differential data and then is transmitted to the differential bus BS4 [1]. Conversely, the differential bus driver DFV converts differential data, which is received from the differential bus BS4[1], into single data and then transmits the data to the GPIO interface GIF (not shown). The differential bus driver DFV is typified by a configuration based on the RS485 standard.

As described above, in a control system for a robot or the like, multiple controlled modules coupled to a bus may increase the wiring length of the bus. Additionally, noise caused by a motor MT or the like may be superimposed on the bus. Thus, also in this case, the differential buses BS [1] to BS [4] in FIG. 19 are advantageously used for reliable communications through the GPIO interface GIF.

The invention made by the inventors was specifically described above according to the embodiments. The present invention is not limited to the embodiments and can be changed in various ways within the scope of the invention. For example, the embodiments were described in detail to illustrate the present invention that is not limited to the provision of all the described configurations. Moreover, the configuration of one of the embodiments can be partially replaced with that of another one of the embodiments. Alternatively, the configuration of one of the embodiments can be added to that of another one of the embodiments. Furthermore, the configurations of the embodiments may be partially provided with another configuration, deleted, or replaced with another configuration.

For example, the I2C bus BS1 is used, but not exclusively, as a first serial bus. Specifically, like the I2C bus BS1, a similarly applicable bus operates in a master or slave state and carries out serial communications with a specified address.

(Note)

A plug-and-play method for a serial communication system according to the present embodiment uses first and second serial buses, a control unit, and a plurality of electronic devices. The control unit is connected to the first and second serial buses and transmits a first command containing an address to the first serial bus. The electronic devices are each detachable from the first and second serial buses. If the electronic device coupled to the first and second serial buses receives the first command containing the address of the electronic device from the first serial bus, the electronic device transmits an acknowledgement to the first serial bus. In this case, when the electronic devices are coupled to the first and second serial buses, the first signal is transmitted to the second serial bus. The control unit stops communications with the first serial bus when receiving the first signal. Each of the electronic devices transmits the first command containing a candidate address to the first serial bus; meanwhile, the electronic device searches for an address where an acknowledgement is not received in response to the first command, and then the electronic device transmits the address as a search result to the second serial bus. The control unit receives the address as the search result from the second serial bus.

What is claimed is:

1. A serial communication system comprising:
   first and second serial buses;
   a control unit that is connected to the first and second serial buses and configured to transmit a first command containing an address to the first serial bus; and
   a plurality of electronic devices detachable from the first and second serial buses, each of the electronic devices transmitting a respective acknowledgement to the first serial bus when the respective electronic device connected to the first and second serial buses receives the first command containing the address thereof from the first serial bus,
   wherein each of the electronic devices includes a controller configured to:
   transmit a first signal to the second serial bus when the respective electronic device is coupled to the first and second serial buses;
   search for an address when the acknowledgement is not received in response to the first command while transmitting the first command containing a candidate address to the first serial bus after the transmission of the first signal; and
   transmit a search result address as a result of the search, to the second serial bus,
   wherein the control unit, when the first signal is received, is configured to change to a sleep state that stops communications with the first serial bus and receives the search result address from the second serial bus.

2. The serial communication system according to claim 1, wherein each of the electronic devices is configured to transmit the first command to the first serial bus, and receive the first command from the first serial bus, and
   wherein the control unit is configured to transmit the first command to the first serial bus but not receive the first command from the first serial bus.

3. The serial communication system according to claim 2, wherein the first serial bus is an inter-integrated circuit (I2C) bus based on an I2C standard,
   wherein the electronic devices are each configured to operate in both in a master state and a slave state based on the I2C standard, and
   wherein the control unit is configured to operate only in a master state based on the I2C standard.

4. The serial communication system according to claim 3, wherein each of the electronic devices is further configured to transmit the first signal to the second serial bus, transmit a start condition for an operation in the master state to the first serial bus, and search for the address when electronic device is placed into the master state, and
   wherein the control unit, when the first signal is received, is further configured to change to the sleep state, recover from the sleep state at completion of reception of the candidate address, and transmit the start condition to the first serial bus.

5. The serial communication system according to claim 3, wherein each of the electronic devices is further configured to transmit the search result address to the second serial bus and transmit, in synchronization with the transmission of the search result address, a clock signal to a clock wire included in the first serial bus, and
   wherein the control unit is configured to receive the search result address in bits from the second serial bus in synchronization with the clock signal received from the clock wire.

6. The serial communication system according to claim 1, further comprising a plurality of the first serial buses and a plurality of the second serial buses,
   wherein the control unit includes:
   a plurality of first serial interfaces connected to the respective first serial buses; and
   a plurality of second serial interfaces connected to the respective second serial buses,
   wherein one or more of the first serial interfaces transmit the first command to the first serial bus but do not receive the first command from the first serial bus.

7. The serial communication system according to claim 6, wherein the control unit includes:
   a host controller configured to issue, to the electronic devices, a second command containing device identifiers for identifying the electronic devices; and
   a communication control unit that has a host interface configured to communicate with the host controller, the first and second serial interfaces, and an address management memory,
   wherein the address management memory stores correlations among the device identifiers, bus identifiers for identifying the first serial buses, and addresses in the first serial buses identified by the bus identifiers, and
   wherein the communication control unit is configured to transmit the first command containing a predetermined address, to a predetermined one of the first serial buses based on the correlations of the address management memory when the second command is received from the host controller, and register the search result address in the address management memory when the search result address is received from the second serial bus.

8. The serial communication system according to claim 1, wherein the second serial bus is a general purpose input output (GPIO) bus.

9. The serial communication system according to claim 1, wherein the second serial bus is a differential bus for transmitting differential data.

10. A communication control unit that controls, through a first serial bus, a plurality of electronic devices detachable from first and second serial buses,
the communication control unit comprising:
a first serial interface configured to control the electronic devices by transmitting, to the first serial bus, a first command containing an address of one of the electronic devices coupled to the first serial bus;
a second serial interface configured to receive a signal from one of the electronic devices coupled to the second serial bus; and
a controller configured to control the first and second serial interfaces,
wherein each of the electronic devices coupled to the first and second serial buses transmits a first signal to the second serial bus, searches for an address usable for the electronic device through the first serial bus, and transmits a search result address, as a result of the search, to the second serial bus, and
wherein the controller, when the first signal is received, is configured to change to a sleep state that stops communications with the first serial bus and receive the search result address from the second serial bus.

11. The communication control unit according to claim 10, wherein the first serial interface is configured to transmit the first command to the first serial bus but not receive the first command from the first serial bus.

12. The communication control unit according to claim 11, wherein the first serial bus is an I2C bus based on an I2C standard,
wherein the first serial interface is configured to operate only in a master state based on the I2C standard, and
wherein the controller, when the first signal is received at the second serial interface, is configured to change the first serial interface to the sleep state, recover from the sleep state at completion of reception of the search result address in the second serial interface, and transmit a start condition for an operation in the master state to the first serial bus through the first serial interface.

13. The communication control unit according to claim 11, comprising:
a plurality of the first serial interfaces and a plurality of the second serial interfaces for the respective first and second serial buses,
wherein one or more of the first serial interfaces transmit the first command to the first serial bus but do not receive the first command from the first serial bus.

14. The communication control unit according to claim 13, further comprising:
a host interface configured to communicate with a host controller; and
an address management memory,
wherein the host controller is configured to issue, to the electronic devices, a second command containing device identifiers for identifying the electronic devices,
wherein the address management memory stores correlations among the device identifiers, bus identifiers for identifying the first serial buses, and addresses in the first serial buses identified by the bus identifiers, and
wherein the controller is configured to transmit the first command containing a predetermined address, to the first serial bus through the first serial interface based on the correlations of the address management memory when the second command is received from the host controller, and register the search result address in the address management memory when the address is received from the second serial bus.

15. The communication control unit according to claim 10, wherein the second serial bus is a GPIO bus.

16. An electronic device detachable from first and second serial buses, the electronic device comprising:
a first serial interface configured to receive a first command containing an address from the first serial bus coupled to the first serial interface, and transmit an acknowledgement to the first serial bus when the received address is identical to an address of the first serial interface;
a second serial interface configured to transmit a signal to the second serial bus; and
a controller configured to control the first and second serial interfaces,
wherein the controller is further configured to:
transmit a first signal to the second serial bus through the second serial interface when the control unit is coupled to the first and second serial buses;
search for an address when the acknowledgement is not received in response to the first command while transmitting the first command containing a candidate address to the first serial bus after the transmission of the first signal through the second serial interface; and
transmit a search result address, as a result of the search, to the second serial bus through the second serial interface,
wherein the first serial interface is configured to transmit the first command to the first serial bus, and receive the first command from the first serial bus,
wherein the first serial bus is an I2C bus based on an I2C standard,
wherein the first serial interface is configured to operate in both a master state and a slave state based on the I2C standard,
wherein the controller is configured to transmit the first signal to the second serial bus, transmit a start condition for an operation in the master state to the first serial bus through the first serial interface, and search for the address when the controller is placed into the master state, and
wherein the controller is further configured to transmit the search result address to the second serial bus and transmit a clock signal in synchronization with the transmission of the search result address through the first serial interface to a clock wire included in the first serial bus.

17. An electronic device detachable from first and second serial buses, the electronic device comprising:
a first serial interface configured to receive a first command containing an address from the first serial bus coupled to the first serial interface, and transmit an acknowledgement to the first serial bus when the received address is identical to an address of the first serial interface;
a second serial interface configured to transmit a signal to the second serial bus; and
a controller configured to control the first and second serial interfaces,
wherein the controller is further configured to:
transmit a first signal to the second serial bus through the second serial interface when the control unit is coupled to the first and second serial buses;
search for an address when the acknowledgement is not received in response to the first command while transmitting the first command containing a candidate address to the first serial bus after the transmission of the first signal through the second serial interface; and transmit a search result address, as a result of the search, to the second serial bus through the second serial interface, wherein the first and second serial interfaces and the control unit are formed on a same semiconductor chip, wherein the semiconductor chip is mounted on a circuit board, wherein an external switch is mounted on the circuit board with a first end connected to the second serial bus and a second end receiving a fixed voltage, and wherein the second serial interface is configured to control on and off operation of the external switch so as to transmit the first signal and the search result address.

* * * * *